United States Patent
Guiavarc'h et al.

(10) Patent No.: US 12,493,586 B2
(45) Date of Patent: Dec. 9, 2025

(54) RESOLVING CONFLICTS DURING SYNCHRONIZATION OF DOCUMENT OBJECTS

(71) Applicant: MyScript, Nantes (FR)

(72) Inventors: Jean-Nicolas Guiavarc'h, Nantes (FR); Luc Potage, Nantes (FR); Guillaume Aujay, Nantes (FR); Cédric Coulon, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 18/579,224

(22) PCT Filed: May 30, 2022

(86) PCT No.: PCT/EP2022/064622
§ 371 (c)(1),
(2) Date: Jan. 12, 2024

(87) PCT Pub. No.: WO2023/285019
PCT Pub. Date: Jan. 19, 2023

(65) Prior Publication Data
US 2024/0320195 A1 Sep. 26, 2024

(30) Foreign Application Priority Data
Jul. 15, 2021 (EP) .................... 21305984

(51) Int. Cl.
*G06F 16/178* (2019.01)
*G06F 16/13* (2019.01)
(Continued)

(52) U.S. Cl.
CPC ............ *G06F 16/178* (2019.01); *G06F 16/13* (2019.01); *G06F 16/1767* (2019.01);
(Continued)

(58) Field of Classification Search
CPC .... G06F 16/178; G06F 16/1767; G06F 16/13; G06F 16/1873; G06F 16/219; G06F 16/2358; G06F 16/275
(Continued)

(56) References Cited

U.S. PATENT DOCUMENTS 6,247,050 B1 * 6/2001 Tso .................... H04L 67/56
709/224
2013/0124612 A1 5/2013 Braginsky et al.
(Continued)

OTHER PUBLICATIONS

EPO—International Search Report and Written Opinion for related International Application No. PCT/EP2022/064622, mailed Nov. 25, 2022, 15 pgs.

*Primary Examiner* — Shahid A Alam
(74) *Attorney, Agent, or Firm* — McDermott Will & Schulte LLP

(57) ABSTRACT

The invention relates to a method implemented by a first device (DV1) cooperating with a cloud (CL) of at least one server for resolving a synchronization conflict over different versions of a document object comprising at least one content file and one object descriptor file (ODF1). The method comprising obtaining a first version of the document object; performing a first synchronization phase comprising sending the first version (ODF1) of the object descriptor file, independently of the first version of the content file, to the cloud (CL); performing a second synchronization phase for resolving the conflict by re-sending the first version (ODF1) of the object descriptor file of the first device (DV1) to the cloud (CL); performing a third synchronization phase subsequent to the second synchronization phase, comprising sending the first version of the content file to the cloud (CL) for storing said first version of content file.

19 Claims, 13 Drawing Sheets

(51) Int. Cl.
*G06F 16/176* (2019.01)
*G06F 16/18* (2019.01)
*G06F 16/21* (2019.01)
*G06F 16/23* (2019.01)
*G06F 16/27* (2019.01)

(52) U.S. Cl.
CPC ........ *G06F 16/1873* (2019.01); *G06F 16/219* (2019.01); *G06F 16/2358* (2019.01); *G06F 16/27* (2019.01); *G06F 16/275* (2019.01)

(58) Field of Classification Search
USPC ........................................................ 707/634
See application file for complete search history.

(56) References Cited

U.S. PATENT DOCUMENTS

| | | | |
|---|---|---|---|
| 2013/0124956 A1 | 5/2013 | Hatfield et al. | |
| 2016/0154817 A1* | 6/2016 | Mason, Jr. .......... | G06F 16/1827 707/704 |
| 2018/0189369 A1* | 7/2018 | Baek .................. | G06F 16/2358 |

* cited by examiner

RESOLVING CONFLICTS DURING SYNCHRONIZATION OF DOCUMENT OBJECTS

CROSS-REFERENCE TO RELATED APPLICATIONS

This application is a U.S. National Phase application under 35 U.S.C. § 371 of International Application No. PCT/EP2022/064622, filed on May 30, 2022; which claims the benefit of priority to European Patent Application No. 21305984.3, filed Jul. 15, 2021; both of which are incorporated herein by reference in their entirety for all purposes.

FIELD OF THE INVENTION

The present disclosure relates to file system architecture and algorithms and more specifically to conflict resolution during synchronization of document objects.

BACKGROUND

Computing devices continue to become more ubiquitous to daily life. They may take various forms such as computer desktops, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

The computing devices include components of at least one processing element, such as a central processing unit (CPU), some form of memory and input and/or output (I/O) devices.

The components communicate with each other and with a network through inputs and outputs, such as connectors, lines, buses, cables, buffers, electromagnetic links, networks, modems, transducers, IR ports, antennas, or others known to those of ordinary skill in the art.

Each type of computing device is equipped with particular computing resources and destined for given uses. The variety of computing devices and their subsequent uses necessitate a variety of input devices and interfaces to allow users to interact with their computing devices.

One such input device is a touch sensitive surface such as a touchscreen or touchpad wherein the user input is received through contact between a user body part (e.g. a finger) or an instrument (e.g. a pen or stylus), and the touch sensitive surface.

The memory includes an operating system and a document management system. The document management system includes one or more processing elements related to detection, management and treatment of user input.

Handwriting recognition can be implemented in computing devices to input and process various types of input elements hand-drawn or handwritten by a user, such as text content (e.g., alphanumeric characters) or non-text content (e.g. shapes, drawings). Once input on a computing device, the input elements are usually displayed as digital ink and undergo handwriting recognition to be converted into typeset versions. The user handwriting input is typically interpreted using a real-time handwriting recognition system or method. To this end, either on-line systems (recognition carried out using a cloud-based solution or the like) or off-line systems may be used.

Nowadays, users may have multiple computing devices, and store documents on various computers, wherein documents stored over different devices need to be managed and synchronized efficiently.

Cloud-based file synchronization can address these challenges. It can synchronize documents among various computing devices automatically as documents are not only stored on multiple computing devices, but also on a storage server in the cloud data center which provides cloud-based file synchronization. Once a document has been modified, it will be synchronized to other clients and servers sooner or later. All modifications should be detected and noticed to other devices and servers.

However, the data centers deployed nowadays are based on different technologies and thus involve different means, techniques, protocols and the like to assure document synchronization. In particular, cloud-based file synchronization protocols, designed to maintain the consistency of documents shared by multiple devices, may be different, depending on the data center. Notably, synchronization protocols implement rules dealing with synchronization conflicts, but synchronization protocols may vary as they inherently depend on the technology implemented by each external cloud-based service. As a result, in case of a synchronization conflict, specific conflict resolution rules may cause to reject the latest modifications until the earliest modifications have been computed, while other conflict resolution rules may cause duplication of the document to end up with two parallel documents to deal with.

The user handwritten input elements may be interpreted and stored as objects within a file. Such file may be synchronized by cloud-based file synchronization; however, the existing synchronization protocols present some major drawbacks.

If the user modifies an object, the whole file needs to be sent with all the objects and attachments, which may cost a much bigger amount of network bandwidth than the actual modification should require. Also, if the user adds a first object to a file from a first device and a second object to the same file from a second device then the whole file is in a conflicting state and the user will have to choose which one to keep and which one to lose.

To provide a fine-tuned conflict resolution as well as optimizing the network bandwidth, different objects are stored as different files with associated metadata files including dependencies between the objects. Therefore, synchronization of an object with a cloud involves two files, the first referred herein as a "content file", storing object content, and the second as an "object descriptor" file storing metadata and dependencies between different objects. A content file and an object descriptor file defining a document object are permanently linked, and therefore need to be synchronized together reliably.

Because of the different technology-dependent approaches used by existing data centers to perform document synchronization, it is difficult, if not impossible, for users of multiple devices to maintain consistency of documents over the devices. If several devices of a user, or even multiple users, cooperate with different data centers, there is a risk that synchronization conflicts arise. For instance, difficulties will arise if a user uses multiple computing devices to manage (store, read, modify, etc.) document objects, such as for instance an Apple device using icloud® and a personal computer using Google Drive® or Dropbox®. Typically, the type of data center (or cloud provider)

used by a computing device is dictated by the OS technology of the computing device. In any case, a lack of efficiency may result in the way documents are synchronized over multiple devices.

Synchronization conflicts may be even more problematic in cases where a same document object is shared and modified by means of multiple devices while they are off-line (so that no synchronization can be made on-line with a data center). Once these devices establish online connection with their respective center, there is a risk that document synchronizations are performed in various and inappropriate orders depending on when each device can reach its respective data center.

Additionally, a risk of data loss may arise from the above issues of document synchronization.

There is thus a need for a solution allowing efficient synchronization between multiple devices. In particular, there is need for sharing or storing document objects over multiple devices and a remote storage (e.g. a cloud or a server) so that document consistency is maintained in an efficient and reliable manner without data loss. In particular, there is a need for resolving synchronization conflicts, i.e. any inconsistency between document versions in a cloud-based system. In particular, there is a need for avoiding or resolving synchronization conflicts over multiple devices, irrespective of the technology implemented by each device.

SUMMARY OF THE INVENTION

An aim of the present invention is to address at least one of the problems and deficiencies previously discussed.

More particularly, the examples of the present disclosure that are described herein below provide methods, systems and computer program products for synchronizing different versions of a document object, wherein said document object comprises at least one content file and one object descriptor file, said content file comprising a content and said object descriptor file comprising at least one object descriptor defining said content.

According to a first aspect of the present invention, there is provided a computer implemented method, implemented by a first device, for synchronizing different versions of a document object in cooperation with a cloud, wherein each version of said document object comprises at least one content file and one object descriptor file, said content file comprising a content and said object descriptor file comprising at least one object descriptor defining said content, said method comprising:
   a) obtaining a first version of the document object comprising a first version of the content file and a first version of the object descriptor file, said first version of the object descriptor file comprising a first object descriptor in association with a first timestamp;
   b) sending the first version of the object descriptor file, independently of the first version of the content file, to the cloud for causing said cloud to store said first version of the object descriptor file;
   c) performing a first synchronization phase comprising:
   c1) checking a second timestamp comprised in a second version of the object descriptor file currently stored in the cloud;
   c2) if first timestamp of the first version of object descriptor file stored by the first device is later than the second timestamp of the cloud checked in c1), detecting a first document synchronization conflict;
   c3) resolving said first synchronization conflict by re-sending the first version of the object descriptor file to the cloud for causing said cloud to store said first version of the object descriptor file.

In a particular embodiment, after said re-sending e), triggering a subsequent synchronization phase comprising:
   d) checking a second timestamp comprised in a second version of the object descriptor file currently stored in the cloud; and
   e) if the first timestamp of the first version of the descriptor file stored by the first device matches the second timestamp of the cloud checked in d), sending the first version of the content file to the cloud for causing said cloud to store said first version of the content file.

In a particular embodiment, the first synchronization phase further comprises:
   c4) if the first timestamp of the first version of the object descriptor file stored by the first device is earlier than the second timestamp of the cloud checked in c1), detecting a second synchronization conflict; and
   c5) synchronizing the first device with the cloud by obtaining from the cloud the second version of the object descriptor file, independently of the second version of the content file, for storing said second version of the object descriptor file by the first device.

In a particular embodiment, after said synchronizing c5), triggering a subsequent synchronization phase comprising:
   f) checking a second timestamp comprised in a second version of the object description file currently stored in the cloud; and
   g) if the second timestamp of the second version of the object descriptor file stored by the first device matches the second timestamp of the cloud checked in f), synchronizing the first device with the cloud by obtaining from the cloud the second version of the content file for storing said second version of the content file by the first device.

In a particular embodiment, the first synchronization phase further comprises:
   c6) if it is detected, based on said checking c1), that the first timestamp of the first version of the object descriptor file stored by the first device matches the second timestamp of the second version of the descriptor file stored in the cloud, sending the first version of the content file to the cloud for causing said cloud to store said first version of the content file.

In a particular embodiment, said obtaining a) a first version of the document object comprises:
   a1) acquiring a first handwriting input for modifying an initial version of the document object initially stored by the first device, said initial version of the document object comprising an initial version of the content file and an initial version of the object description file; and
   a2) generating the first version of the document object by updating the initial version of the document object based on the first handwriting input.

In a particular embodiment, the method comprises an initial synchronization phase, prior to said first synchronization phase, comprising:
   b1) checking an initial timestamp comprised in the initial version of the object descriptor file initially stored in the cloud;
   b2) if the first timestamp of the first version of the object descriptor file of the first device is later than the initial timestamp checked in b1),
   b3) triggering the sending b) of the first version of the object descriptor file to the cloud.

According to a second aspect of the present invention, there is provided a computer implemented method, implemented by a system comprising a first device and a second device cooperating with a cloud, for synchronizing different versions of a document object, wherein each version of said document object comprises at least one content file and one object descriptor file, said content file comprising a content and said object descriptor file comprising at least one object descriptor defining said content, wherein the first and second devices synchronize the different versions of the document object by cooperating respectively with the cloud in accordance with the method of first aspect.

In a particular embodiment, the method comprises:
a) obtaining, by the first device, a first version of the document object comprising a first version of the content file and a first version of the object descriptor file, said first version of the object descriptor file comprising a first object descriptor in association with a first timestamp;
b) obtaining, by the second device, a second version of the document object comprising a second version of the content file and a second version of the object descriptor file, said second version of the object descriptor file comprising a second object descriptor in association with a second timestamp, wherein the second timestamp is earlier than the first timestamp;
c) sending, by the first device, the first version of the object descriptor file, independently of the first version of the content file, to the cloud for causing said cloud to store said first version of the object descriptor file;
d) after said sending c), sending, by the second device, the second version of the object descriptor file, independently of the second version of the content file, to the cloud for causing said cloud to store said second version of the object descriptor file thereby overwriting the first version of the content file;
e) performing, by the first device, a first synchronization phase comprising:
  e1) checking a timestamp comprised in a version of the descriptor file currently stored in the cloud;
  e2) if the first timestamp of the first version of descriptor file stored by the first device is later than the timestamp of the cloud checked in e1), detecting a first synchronization conflict; and
  e3) in response to the first synchronization conflict, re-sending the first version of the object descriptor file to the cloud for causing said cloud to store said first version of the object descriptor file; and
f) performing, by the second device, a second synchronization phase subsequent to the first synchronization phase, comprising obtaining from the cloud the first version of the object descriptor file independently of the first version of the content file, for storing said first version of the object descriptor file to the second device.

According to a third aspect of the present invention, there is provided a computer program comprising instructions, when executed by one or more processors, causes the one or more processors to carry out the method of the first and/or second aspects.

According to a fourth aspect of the present invention, there is provided a non-transitory storage medium carrying instructions of program code for executing the method of the first and/or second aspects.

According to a fifth aspect of the present invention, there is provided a device configured to cooperate with a cloud, for synchronizing different versions of a document object, wherein each version of said document object comprises at least one content file and one object descriptor file, said content file comprising a content and said object descriptor file comprising at least one object descriptor defining said content, said device comprising modules for performing the method of the first aspect.

In a particular embodiment, the device comprises:
an acquisition module for obtaining a first version of the document object comprising a first version of the content file and a first version of the object descriptor file, said first version of the object descriptor file comprising a first object descriptor in association with a first timestamp;
a synchronization module for sending the first version of the object descriptor file, independently of the first version of the content file, to the cloud for causing said cloud to store said first version of the object descriptor file;
a conflict resolution module for performing a first synchronization phase comprising:
  c1) checking a second timestamp comprised in a second version of the descriptor file currently stored in the cloud;
  c2) if the first timestamp of the first version of the object descriptor file stored by the first device is later than the second timestamp of the cloud checked in c1), detecting a first synchronization conflict; and
  c3) resolving said first synchronization conflict by re-sending the first version of the object descriptor file to the cloud for causing said cloud to store said first version of the object descriptor file.

According to a sixth aspect of the present invention, there is provide a system comprising a first computing device and a second device configured to cooperate with a cloud, for synchronizing different versions of a document object, wherein each version of said document object comprises at least one content file and one object descriptor file, said content file comprising a content and said object descriptor file comprising at least one object descriptor defining said content, said first and second devices comprising modules for performing the method of the first aspect.

According to a 7th aspect of the present invention, there is provided a method, implemented by a first device, for managing different versions of a document object in cooperation with a cloud, wherein each version of said document object comprises at least one content file and one object descriptor file, said content file comprising a content and said object descriptor file comprising at least one object descriptor defining said content, wherein said object descriptor file comprises a version history, said method comprising:
a) storing a first version of the document object comprising a first version of the content file and a first version of the object descriptor file, said first version of the object descriptor file comprising a first version history defining at least one previous version of said document object on which basis the first version of the document object has been created;
b) retrieving a second version history comprised in a second version of the object descriptor file currently stored as part of a second version of the document object in the cloud, said second version history defining at least one previous version of said document object on which basis the second version of the document object has been created;
c) performing a comparison of the first and second version histories to determine whether any of the first and second versions of the document object originates from the other;

d) if it is detected, based on the comparison c), that the first version of the document object originates from the second version of the document object while the second version of the document object does not originate from the first version of the document object, sending the first version of the content file to the cloud, independently of the first version of the object descriptor file, to cause the cloud to store said first version of the content file.

In a particular embodiment, the method comprises, after said sending d):

e) sending the first version of the object descriptor file to the cloud for causing said cloud to store said first version of the object descriptor file.

In a particular embodiment, the method further comprises:

f) if it is detected, based on the comparison c), that the second version of the document object originates from the first version of the document object, obtaining a second version of the content file currently stored as part of the second version of the document object in the cloud for storing by the first device.

In a particular embodiment, the method further comprises:

g) if it is detected, based on the comparison c), that none of the first and the second versions of the document object originates from the other, performing a resolution phase comprising:
  g1) retrieving the second version of the document object currently stored in the cloud;
  g2) obtaining a copy of the first version of the document object by duplicating said first version of the document object and sending said copy to the cloud for causing storing of said copy by the cloud; and
  g3) storing simultaneously the first and second versions of the document object.

In a particular embodiment, the method further comprises:
  g4) selecting, based on a user-defined instruction obtained by the first device, one of the first and second versions which is maintained in a local memory of the first device while the other non-elected version is deleted from said local memory.

In a particular embodiment, the version histories of the first and second versions of the document object comprise at least one signature for authenticating a previous version of the document object.

In a particular embodiment, the version histories of the first and second versions of the document object comprise, in association with said at least one signature, at least one timestamp representative of a modification time of said previous version.

In a particular embodiment, said storing a) comprises:
  a3) acquiring a first handwriting input for modifying an initial version of the document object initially stored by the first device, said initial version of the document object comprising an initial version of the content file and an initial version of the object descriptor file; and
  a4) generating the first version of the document object by updating the initial version of the document object based on the first handwriting input.

According to a $8^{th}$ aspect of the present invention, there is provided a method, implemented by a system comprising a first device and a second device, for synchronizing different versions of a document object in cooperation with a cloud, wherein each version of said document object comprises at least one content file and one object descriptor file, said content file comprising a content and said object descriptor file comprising at least one object descriptor defining said content, wherein said object descriptor file comprises a version history, wherein the first and second devices synchronize the different versions of the document object by cooperating respectively with the cloud in accordance with the method of the $7^{th}$ aspect.

According to a $9^{th}$ aspect of the present invention, there is provided a computer program comprising instructions which, when executed by one or more processors, causes the one or more processors to carry out the method of the $7^{th}$ and/or $8^{th}$ aspects.

According to a $10^{th}$ aspect of the present invention, there is provided a non-transitory storage medium carrying instructions of program code for executing the method of the $7^{th}$ and/or $8^{th}$ aspects.

According to a $11^{th}$ aspect of the present invention, there is provided a device configured to cooperate with a cloud, for synchronizing different versions of a document object, wherein each version of said document object comprises at least one content file and one object descriptor file, said content file comprising a content and said object descriptor file comprising at least one object descriptor defining said content, wherein said object descriptor file comprises a version history, said device comprising modules for performing the method of the $7^{th}$ and/or $8^{th}$ aspects.

According to a $12^{th}$ aspect of the present invention, there is provided a system comprising first and second devices configured to cooperate with a cloud, for synchronizing different versions of a document object, wherein each version of said document object comprises at least one content file and one object descriptor file, said content file comprising a content and said object descriptor file comprising at least one object descriptor defining said content, wherein said object descriptor file comprises a version history, said first and second devices comprising modules for performing the method of the $7^{th}$ and/or $8^{th}$ aspects.

In a $13^{th}$ aspect of the present invention, particular embodiments of the $7^{th}$ to $12^{th}$ aspects are provided.

In a particular embodiment, the method further comprises:
  h) determining a first unique identifier which is stored by the cloud in association with the first version of the content file sent in d) ($7^{th}$ aspect);
the method further comprising, after said sending d) ($7^{th}$ aspect):
  i) retrieving a unique identifier currently stored in the cloud in association with a version of the content file;
  j) detecting a file mismatch conflict if the unique identifier retrieved in i) does not match the first unique identifier;
  k) resolving the file mismatch conflict by sending the first version of the content file for causing said cloud to re-store said first version of the content file.

In a particular embodiment, the sending d) comprises sending the first unique identifier along with the first version of the content file to the cloud to cause the cloud to store the first unique identifier in association with the first version of the content file.

In a particular embodiment, said determining h) is performed by receiving, in response to the sending d), the first unique identifier assigned by the cloud in association with the first version of the content file.

In a particular embodiment, the method further comprises:
  l) determining a first unique identifier which is stored by the cloud in association with the first version of the object descriptor file sent in e) ($7^{th}$ aspect);

the method further comprising, after said sending e) (7$^{th}$ aspect):

m) retrieving a unique identifier currently stored in the cloud in association with a version of the object descriptor file;
n) detecting a file mismatch conflict if the unique identifier retrieved in m) does not match the first unique identifier; and
o) resolving the file mismatch conflict by sending the first version of the object descriptor file version for causing said cloud to re-store said first version of the object descriptor file.

In a particular embodiment, the sending e) comprises sending the first unique identifier along with the first version of the object descriptor file to the cloud to cause the cloud to store the first unique identifier in association with the first version of the object descriptor file.

In a particular embodiment, said determining I) is performed by receiving, in response to the sending d), the first identifier assigned by the cloud in association with the first version of the content file.

According to a 14$^{th}$ aspect of the present invention, there is provided a method, implemented by a system comprising a first device and a second device, for synchronizing different versions of a document object in cooperation with a cloud, wherein each version of said document object comprises at least one content file and one object descriptor file, said content file comprising a content and said object descriptor file comprising a version history, wherein said object descriptor file comprises a version history, wherein the first and second devices synchronize the different versions of the document object by cooperating respectively with the cloud in accordance with the method of the 13$^{th}$ aspect.

According to a 15$^{th}$ aspect of the present invention, there is provided a computer program comprising instructions which, when executed by one or more processors, causes the one or more processors to carry out the method of the 13$^{th}$ and/or 14$^{th}$ aspects.

According to a 16$^{th}$ aspect of the present invention, there is provided a non-transitory storage medium carrying instructions of program code for executing the method of the 13$^{th}$ and/or 14$^{th}$ aspects.

According to a 17$^{th}$ aspect of the present invention, there is provided a device configured to cooperate with a cloud, for synchronizing different versions of a document object, wherein each version of said document object comprises at least one content file and one object descriptor file, said content file comprising a content and said object descriptor file comprising at least one object descriptor defining said content, wherein said object descriptor file comprises a version history, said device comprising modules for performing the method of the 13$^{th}$ and/or 14$^{th}$ aspects.

According to a 18$^{th}$ aspect of the present invention, there is provided a system comprising first and second devices configured to cooperate with a cloud, for synchronizing different versions of a document object, wherein each version of said document object comprises at least one content file and one object descriptor file, said content file comprising a content and said object descriptor file comprising at least one object descriptor defining said content, wherein said object descriptor file comprises a version history, said first and second devices comprising modules for performing the method of the 13$^{th}$ and/or 14$^{th}$ aspects.

Where functional modules are referred to in the present disclosure for carrying out various steps of the described method(s), it will be understood that these modules may be implemented in hardware, in software, or a combination of the two. When implemented in hardware, the modules may be implemented as one or more hardware modules, such as one or more application specific integrated circuits. When implemented in software, the modules may be implemented as one or more computer programs that are executed on one or more processors.

For each step of the methods of the present invention as defined in the above aspect of the present invention, the computing devices may comprise a corresponding module configured to perform said step.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DESCRIPTION

Figure 1:
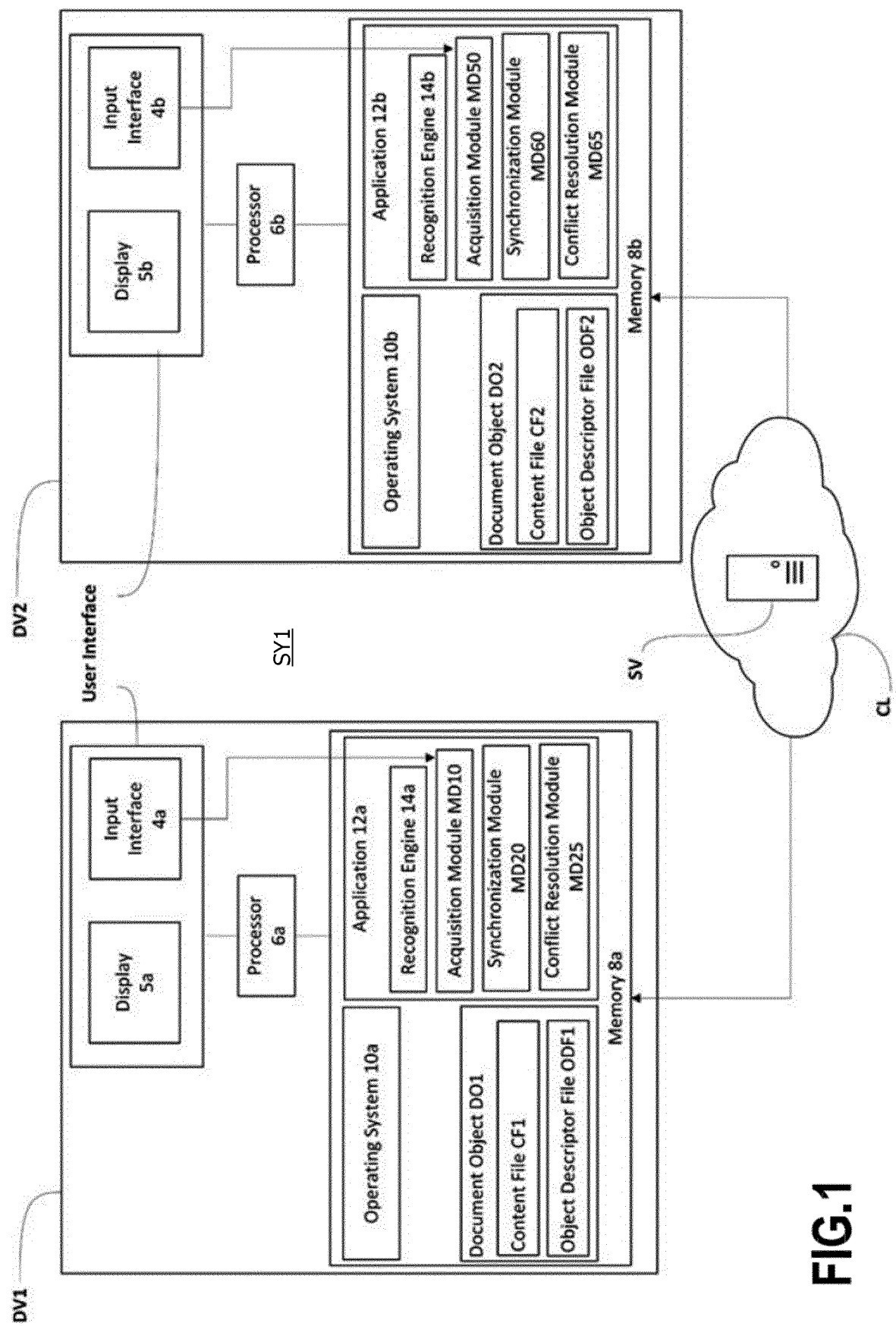
FIG. 1 shows a block diagram of a collaboration environment representing schematically modules according to a particular embodiment of the present invention.

A method implemented by a device for synchronizing different versions of a document object is described below in particular embodiments of the present invention. In particular, a computer implemented methods for resolving a synchronization conflict over different versions of a document object, stored by at least two devices and a cloud is described.

As indicated earlier, the present invention aims at allowing efficient synchronization of different versions of a document object over multiple devices cooperating with a cloud. An aspect of the present invention resides in structuring a document object to be synchronized so that it includes at least a content file and an associated object descriptor file. The content file includes a content and the object descriptor file includes at least an object descriptor. By splitting a document object in two separate files, i.e. the content file and the object descriptor file (metadata), it is possible for a computing device and for a cloud to send and/or receive the content file without the object descriptor file or, conversely, the object descriptor file without the content file.

In the present disclosure, when it is indicated that an entity sends or receives a first item (e.g., an object description file or a content file) independently from a second item, it means that the first item is sent or received without the second item.

In some implementations, the document object is stored by at least two computing devices which are configured to cooperate (or connect to), via the network, with a server, or a network of one or more servers also referred to hereinafter as a cloud. In the following examples, it will be assumed that a first computing device and a second computing device cooperate with a cloud to synchronize different versions of a document object.

The content of the document object, which can be of various nature (text, image, etc.), may be displayed on a first display area of the first device and on a second display area of the second device.

Each computing device and the cloud may store a given version of a same document object. A synchronization occurs when a computing device detects that it holds in its local storage an earlier or a later version of the document object than the one stored in the cloud. As will be described below, by splitting the document object into an object descriptor file and a content file, it is possible to synchronize more efficiently such a document object with the cloud.

In particular, a synchronization conflict (or synchronizing default) may arise from a situation where synchronization phases are executed independently by each computing devices with the cloud, this leading in situations where the cloud does not store the most up-to-date version of the document object leading to data loss.

Further, for a given document object stored in a computing device and/or in the cloud, a file inconsistency (also called file mismatch conflict) may arise at a certain point in time if there is a mismatch between the object descriptor file and the content file, if the object descriptor file defines a version of the document object which is different from the version of said content file.

An aim of the present invention is to provide methods, and corresponding computing devices (also called hereinafter devices), for managing and storing a document object in cooperation with a cloud (or at least one server), such that synchronization conflicts over different versions of the document object can be resolved efficiently with no data loss, irrespective of the technology implemented in the computing devices or at the cloud. As will be described below in exemplary embodiments, different approaches or methods can be envisaged to resolve synchronization conflict with limited risk of data loss. A particular aim of the invention may be also to solve file inconsistencies that may arise in a document object stored, for instance in a computing device or in the cloud.

To this end, the present invention proposes to implement processing resources locally in the computing devices so that they can achieve document object synchronization in cooperation with a cloud, such that there is no need for the cloud to implement specific intelligence or process resources for instance to detect or resolve synchronization conflicts.

A general environment that may be implemented to perform methods of the present invention according to various approaches is now described hereafter in exemplary embodiments.

Exemplary Environment

FIG. 1 shows a block diagram of a system SY1 comprising a first computing device DV1, a second computing device DV2 (also called devices DV1 and DV2) and a server SV according to a particular embodiment of the present invention. The computing devices (or digital devices) DV1 and DV2 may each be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing devices DV1 and DV2 may include components of at least one processing elements, some form of memory and input and output (I/O) devices. The components communicate with each other through inputs and outputs, such as connectors, lines, buses, links networks, or others known to the skilled person.

In an exemplary embodiment, the computing devices DV1 and DV2 comprise a first and a second user interface (UI) for enabling a user to interact with the computing devices DV1 and DV2, respectively. Respectively at the first and the second devices DV1 and DV2, the first and the second user interfaces may comprise a first and a second input interface for inputting content, such as text and/or non-text content. The first and the second user interface may comprise any suitable means (mouse, input surface, controller, key, pen etc.) for allowing a user to provide user instructions (commands CMD) for implementing a method in accordance with a particular embodiment of the present invention. The first and the second input interfaces may be adapted to input text and non-text content in any appropriate form, such as in handwritten form and/or in typeset form.

In an exemplary embodiment, the first and the second input interfaces comprise respectively a first and a second input surfaces for handwriting (or hand-drawing) content. The input surfaces are suitable to detect a plurality of strokes of digital ink entered on (or using) said input surface. The input surfaces may employ any appropriate technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surfaces may be a non-touch sensitive surface which is monitored by a position detection system. The user interfaces may also comprise at least one display unit (or display area) for outputting data from the computing devices DV1 and DV2. The display unit 5 may be a screen or the like of any appropriate technology (LCD, plasma . . . ). The display units 5 are suitable to display text and non-text content as digital ink.

The input interfaces 4 may be co-located with the display units 2 or remotely connected thereto. In a particular example, the display unit 5 and the input interface 4 are parts of a touchscreen.

As depicted in FIG. 1, the computing devices further comprise processors 6 (6a, 6b respectively) and non-volatile memories 8 (8a, 8b respectively). The computing devices may also comprise one or more volatile storing elements (RAM).

The processors 6 are hardware devices for executing software, particularly software stored in the memories 8. Each processor 6a, 6b can be at least one processor, for instance any custom made or general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memories 8a, 8b are non-transitory (or non-volatile) computer readable storage media (or recording media) in accordance with particular embodiments of the present invention. The memories 8 may include any combination of non-volatile storing elements (e.g. ROM, EPROM, flash PROM, EEPROM, hard drive, magnetic or optical tape, memory registers, CD-ROM, WORM, DVD, or the like).

A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present exemplary embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The memories 8 may be remote from the computing devices DV1 and DV2, such as at a server SV or cloud-based system, which is remotely accessible by the computing devices. The non-volatile memories 8 are coupled to the processors 6, so that the processors 6 are capable of reading information from and writing information to the memories 8.

In computing devices DV1 and DV2, the memories 8 include operating systems (OS) 10 (10a, 10b respectively) and content management applications (or computer program) 12 (12a, 12b respectively). The operating system 10 controls the execution of the application 12. The applications 12a, 12b constitute (or comprise) computer programs (or computer-readable program code) according to particular embodiments of the invention, these computer programs comprising instructions to implement methods according to particular embodiments of the invention. More generally, these instructions may form an application program tangibly embodied on a processor-readable medium. Instructions to perform methods according to particular embodiments of the invention may be, for example, in hardware, firmware, software, or a combination thereof. Instructions may be found in, for example, an operating system, a separate application, or a combination of the two.

In the present embodiment, the application 12 includes instructions for managing content (text and/or non-text content) of document objects DO (different versions of a document object DO as described further below) which are acquired or obtained in any appropriate manner, for instance by means of the input interfaces 4 or via any other means. In the present example, content which is to be processed may comprise handwriting (formed of strokes of digital ink) and/or typeset content. The application 12 may comprise a recognition engine 14 for performing handwriting recognition based on acquired handwritten content. Recognition of digital ink handwriting input using so-called online recognition techniques can be used, referring to techniques of recognition of digital ink traces as time-sequences of ink points.

Other techniques of handwriting recognition may be also applied, such as offline recognition, referring to techniques of recognition of digital ink as static images acquired from a scanner or a photograph. The recognition engine 14 may execute any appropriate recognition algorithm to recognize handwriting, as well known to the skilled person.

As depicted in FIG. 1, the non-volatile memories 8 of the computing devices DV1, DV2 are suitable to store various data acquired or obtained by these computing devices, including different versions DO0, DO1 and/or DO2 of a document object DO as will be described further below in particular embodiments. For instance, the memory 8a of computing device DV1 is suitable to store a document object DO1 comprising a content file CF1 and an object descriptor file ODF1. Likewise, the memory 8b of computing device DV2 is for instance suitable to store a document object DO2 comprising a content file CF2 and an object descriptor file ODF2. DO1 and DO2 are two versions of a same document object DO.

In an exemplary embodiment, document objects DO (e.g., DO1 and DO2) may be handled by the application 12 in computing devices DV1 and DV2 so as to provide structured content displayed on the display areas 5. This application 12 handles different types of document objects such as a page or part of a page including sections, paragraphs, or titles.

In the examples described below, a document object DO which is to be synchronized includes content and at least one object descriptor (or metadata). Content and object descriptors are stored respectively as at least one content file CF and at least one associated object descriptor file ODF, also referred to as metadata file. The content can be of various types, such as text, or non-text for example diagrams, shapes, drawings, or images.

The applications 12 (12a, 12b) run by computing devices DV1, DV2 may cause display of a content such as text and/or non-text content, rendered from document information stored in the memory, in a manner well understood by one of ordinary skill in the art.

The object descriptors of the object descriptor file ODF define at least one feature (or parameter) of the document object DO, for example, a language, a document type, a title, a content type; etc. The object descriptor may be referred to by a key and/or a value of the key.

Additionally, each object descriptor of a document object DO may be associated in the object descriptor file ODF with a timestamp defining a time (or instant) of the latest modification of the object descriptor (e.g. latest modification of the value of the key). The object descriptor of the document object DO may for instance comprise a key, a value of the key and a timestamp of the latest updated value of the key.

An object descriptor may describe a state of a content of the document object DO. In a particular example, the value of such an object descriptor comprises a signature, for example a SHA-256 hash of the content file, and possibly also a modification time (or timestamp) of the content of the object. In a particular example, object descriptors are stored in an object descriptor file ODF paired with a content file CF, both files matching with a unique identifier. Exemplary embodiments using at least some of these features will be described further below.

Figure 2:
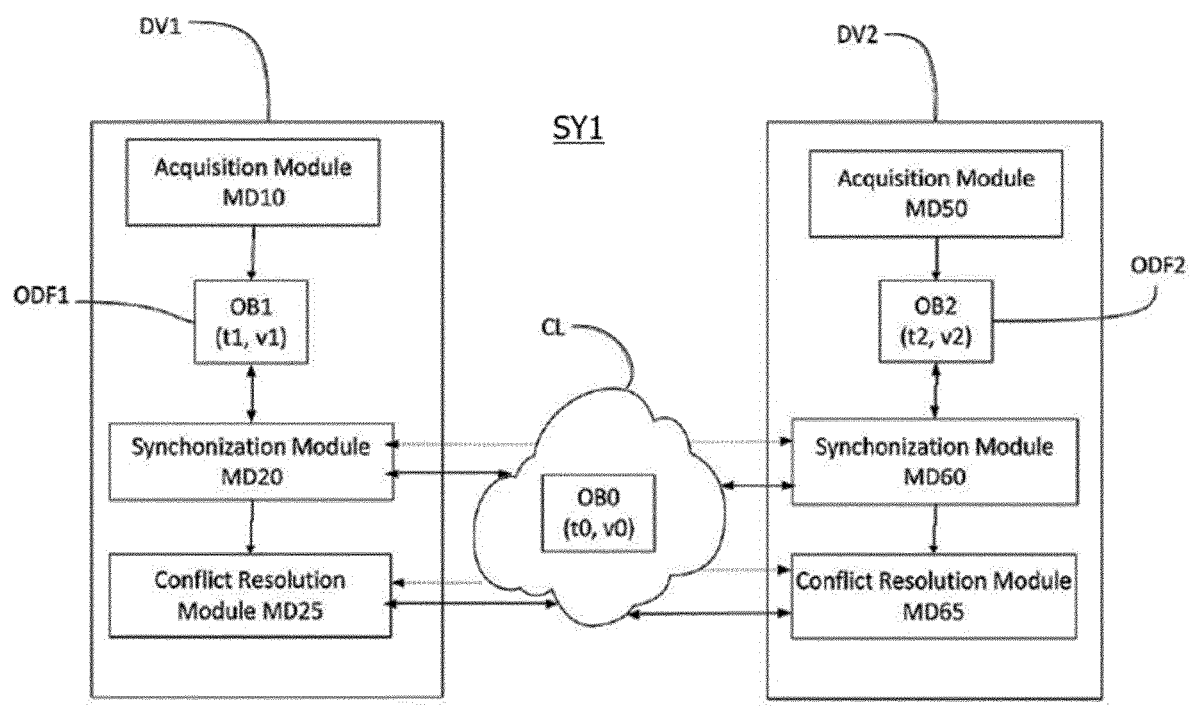
FIG. 2 shows a block diagram of a system comprising two devices and a cloud, for resolving a synchronization conflict over different versions of a document object stored by the two devices and the cloud, according to a particular embodiment of the present invention.

FIG. 2 illustrates a block diagram of a system SY1 according to a particular embodiment, said system comprising at least two devices DV1 and DV2 (named first and second devices) and a cloud CL, for synchronizing different versions of a document object DO stored by the two devices and the cloud. As already indicated, the document object DO includes at least a content file CF and an object descriptor OB defined in an object descriptor file ODF. As shown in FIG. 2, the devices DV1 and DV2 are configured to cooperate with the cloud CL so that they can actively exchange data with the cloud CL.

According to a particular embodiment, when running the applications 12*a*, 12*b* stored in the memories 8*a*, 8*b* (FIG. 1), the processors 6*a*, 6*b* of computing devices DV1, DV2 implement modules configured to perform respectively each step of the methods of the present invention, as will be described further below in particular embodiments. For instance, the following modules shown in FIG. 2 may be implemented: acquisition modules MD10, MD50, synchronization modules MD20, MD60 and conflict resolution modules MD25, MD65, respectively. Generally, the system SY1 is configured to synchronize various versions of a document object DO that may be stored in the devices DV1, DV2 and in the cloud CL. Each device DV1, DV2 is configured to resolve synchronization conflicts that may arise over time, as described below in exemplary embodiments.

At an initial phase, the two devices and the cloud may store an initial version of a document object OB, comprising an initial version of the content file and an initial version of the object descriptor file, the latter including an initial object descriptor OB of an initial value v0 and an initial timestamp t0.

Each local acquisition module MD10 and MD50 may be configured to acquire a handwriting input for modifying the initial version of the document object initially stored by the respective devices.

It should be appreciated that users may independently interact and modify the content of the initial version of the document object on the first and second computing devices DV1 and DV2, from different locations, and at the same time or over time.

The devices may be configured to acquire handwritten input, for instance captured as digital ink and/or gestures. Handwritten input acquired by the devices may lead to modification of the content of a document object, such as typesetting the content, adding content, or manipulating the content, such as erasing, moving, styling, resizing. For example, handwriting input may be acquired on the input areas of the computing devices, and more particularly on the displayed content of the initial document object so that it causes modification of said content of the common document object.

The handwriting inputs on the content of the document object are recognized to generate updated versions of the content file of the respective device.

In a particular example, the computing devices can recognize handwritten input as text or non-text. Each recognized input may be converted to be displayed as output text or non-text with digital equivalents of the handwritten input.

An initial version of the content file may be updated based on handwriting inputs and an initial version of the object descriptor file may be updated by replacing the initial object descriptor OB0 associated with the initial timestamp t0 with updated object descriptors OB1 and OB2 associated with updated timestamps t1 and t2.

In the present disclosure, an initial document object (or initial common version of a document object), such as DO0 (see below), is defined as an identical version of a document object—i.e. an identical version of the content file paired with an identical version of the object descriptor file—which is stored and shared by a plurality of entities (devices, cloud, etc.). An initial document object may for instance be stored by the first and the second computing devices and defined by the same content file version and the same object descriptor file version. The first and second devices may thus display the same content (layout, etc.) on the first and the second display areas.

In a particular example, the initial version DO0 of the object descriptor file ODF includes at least an object descriptor OB0 of an initial state s0 of the content, which may be defined by a key k0, a value or signature v0 and a timestamp t0. The at least two devices may share such an initial document object at an initial state of these at least two devices.

The document objects DO may be loaded, created and/or edited using the computing devices DV1, DV2 and stored in the memory of these devices. This loading may be processed in known manner using the I/O devices described earlier, including the communication of the document from one device to another device via the network.

Modifications performed by users at one device (DV1/DV2) over the content of a document object DO, such as the initial document object DO0, may be shared with the other connected device (DV1/DV2) by means of the synchronization modules MD20 and MD60. Various ways of performing synchronization of versions of the document object DO are possible in the present application, some of which being described hereafter in exemplary embodiments.

In a particular embodiment, the synchronization modules MD20 and MD60 include the following elements at the respective devices DV1 and DV2:

A timestamp checker which is configured to check, at routine check times, a remote timestamp of the object descriptor file version stored in the cloud.
  The synchronization modules MD20, MD60 are configured to trigger synchronization phases, for instance at routine check times. A synchronization phase is a synchronizing operation (a synchronization process)

which may be performed (for instance periodically or upon request) by a computing device to synchronize the version of a document object stored by the computing device with a version of the document object currently stored by the cloud. A synchronization phase may be triggered by checking, at a routine check time, for a timestamp of one or more object descriptor of the object descriptor file version currently stored or held by the cloud. In this checking, the at least one timestamp of the one or more object descriptors of a version of a document object stored by the computing device is compared with the at least one timestamp of the one or more object descriptors of a version of the same document object currently stored by the cloud. This checking allows for instance to determine whether the at least one timestamp of the one or more object descriptors of a version of a document object stored by the computing device is identical to (or earlier than, or later than) the at least one timestamp of the one or more object descriptors of a version of the same document object currently stored by the cloud.

In the present disclosure, detecting that a first timestamp is later (respectively earlier) than a second timestamp means that the first timestamp defines an instant (or point in time) which is later than (respectively earlier than) an instant (or point in time) defined by the second timestamp.

A timestamp identifier which is configured (or used) to identify if the local timestamp differs or equals the remote timestamp.

In case at least one timestamp is different (negative result of the timestamp checking), the synchronization phase may proceed further, by subsequently transferring, between the computing device and the cloud, the object descriptor of the most up-to-date version of the object descriptor file.

A data transmitter which is configured to send or obtain the latest version of the object descriptor file to or from the cloud depending on the timestamp identifier outcome.

The data transmitter may also be configured to send or obtain the latest version of the content file to or from the cloud depending on the outcome of the timestamp identifier outcome.

This transferring may be either sending the most up-to-date version of the object descriptor file from the device to the cloud or obtaining the most up-to-date version of the object descriptor file from the cloud to the device.

Synchronization phases may be performed independently by the two devices DV1, DV2 in cooperation with the cloud CL. Synchronization phases may possibly take longer or shorter depending on the synchronization protocols, bandwidth availability or size of the transferred files involved for each synchronizing phase.

In some cases, synchronization phases may be run in parallel by the first device DV1 and the second device DV2 and thus may overlap over time (i.e. at least parts of the synchronization phases are executed simultaneously), which might create conflicting situation as described below. In particular, a synchronization conflict (or synchronizing default) may arise from a situation where synchronization phases are executed independently by the computing devices with the cloud, this leading in situations where the cloud does not store the most up-to-date version of a document object.

For example, during overlapping synchronization phases of the two devices, both timestamp checkers may check the timestamp of the initial object descriptor file version with the initial timestamp t0 stored in the cloud. Then, a first data transmitter may send the latest updated version of the object descriptor file with the first timestamp t1 to the cloud. Subsequently, a second data transmitter may send the earlier updated version of the object descriptor file with the second timestamp t2 to the cloud. Although the first timestamp t1 is later than the second timestamp t2, it has been overwritten by an earlier object descriptor file version at the cloud. As a result of the overlapping synchronization phases, the latest updated version of the object descriptor file of the first device is not preserved and stored at the cloud.

As indicated earlier, the system SY1 is configured to resolve synchronization conflicts that may arise from (or despite of) the process of synchronization performed by the synchronization modules MD20, MD60. Various ways of resolving a synchronization conflict are possible according to the present invention, some of which being described hereafter in exemplary embodiments.

In a particular embodiment, the conflict resolution modules MD25 and MD65 are configured to resolve the synchronization conflicts by: first checking the updated timestamp of the updated version of the descriptor file currently stored in the cloud; then determining that the updated timestamp of the updated version of the object descriptor file stored by the respective device DV1/DV2 is later than (i.e., defines an instant later than) a timestamp of a version of the object descriptor file currently stored in the cloud CL (whereby a synchronization conflict is detected), wherein the updated version of the descriptor file sent at the previous synchronization phase to the cloud has been overwritten; finally, re-sending the object descriptor file to the cloud CL to resolve the detected synchronization conflict.

In an exemplary embodiment, the conflict resolution module MD25 of the first device DV1 is configured to check the updated timestamp of the updated version of the object descriptor file ODF currently stored in the cloud CL. The conflict resolution module MD25 determines that the timestamp t1 of the updated version of the object descriptor file ODF at the first device DV1 is later than (i.e., defines an instant later than) the timestamp t2 of the object descriptor file version of the cloud CL. Therefore, the conflict resolution module MD25 is configured to resend the first updated version of object descriptor file to the cloud CL to replace the object descriptor file version of the cloud. Consequently, at a next synchronization phase performed by the second device DV2, the synchronization module MD60 determines that the timestamp t2 of the updated version of the object descriptor file ODF at the second device is earlier than (i.e., defines an instant earlier than) the timestamp t1 of the object descriptor file version of the cloud CL. Subsequently, the synchronization module MD60 of the second device is configured to obtain the object descriptor file version from the cloud CL to replace the second updated version of the document object of the second device. The latest updated version of the object descriptor file ODF with the timestamp t1 is then stored by the cloud CL and by the second device DV2.

The configuration of, and steps performed by, the modules MD10, MD20, MD25 in the first computing device DV1 and the modules MD50, MD60 and MD65 in the second computing device DV2 will now be described in exemplary embodiments of the present invention with reference to FIGS. 1-2. In particular, different implementations of a method synchronizing different versions of a document object are described herebelow. It should be noted that the above-described modules constitute exemplary embodiments of the present invention. Generally, for each step of a method performed by a computing device for resolving a synchronization conflict, said computing device may comprise a respective module for performing said step.

More specifically, it is considered in the following exemplary embodiments that methods for synchronizing different versions of a document object DO are performed by at least two computing devices DV1, DV2 (e.g., as previously described with reference to FIGS. 1-2) cooperating with a cloud (or group of at least one server) CL. More specifically, it is assumed below that each computing device DV1, DV2 implements in cooperation with the cloud CL a method according to a particular embodiment of the invention. The number of computing devices cooperating with the cloud CL may be adapted depending on each case.

The first and second devices DV1, DV2 and the cloud CL may each store a document object DO of various versions. As previously described, the document object DO comprises a content file CF and an object descriptor file ODF, so that each version of the document object DO comprises a corresponding version of the content file CF and object descriptor file ODF. In other words, for each version of the document object DO, the content file CF of the document object DO contains a given content while the object descriptor file ODF of the document object DO contains at least one object descriptor OB defining (or characterizing) the content of the content file CF.

As described below, the first and second computing devices DV1, DV2 perform a synchronization to ensure that the most up-to-date version of the document object is stored in the computing devices DV1, DV2 and in the cloud CL. The computing devices DV1, DV2 also resolve synchronization conflicts that may arise over time between different versions of the document object DO.

First Exemplary Embodiment

Figure 3:
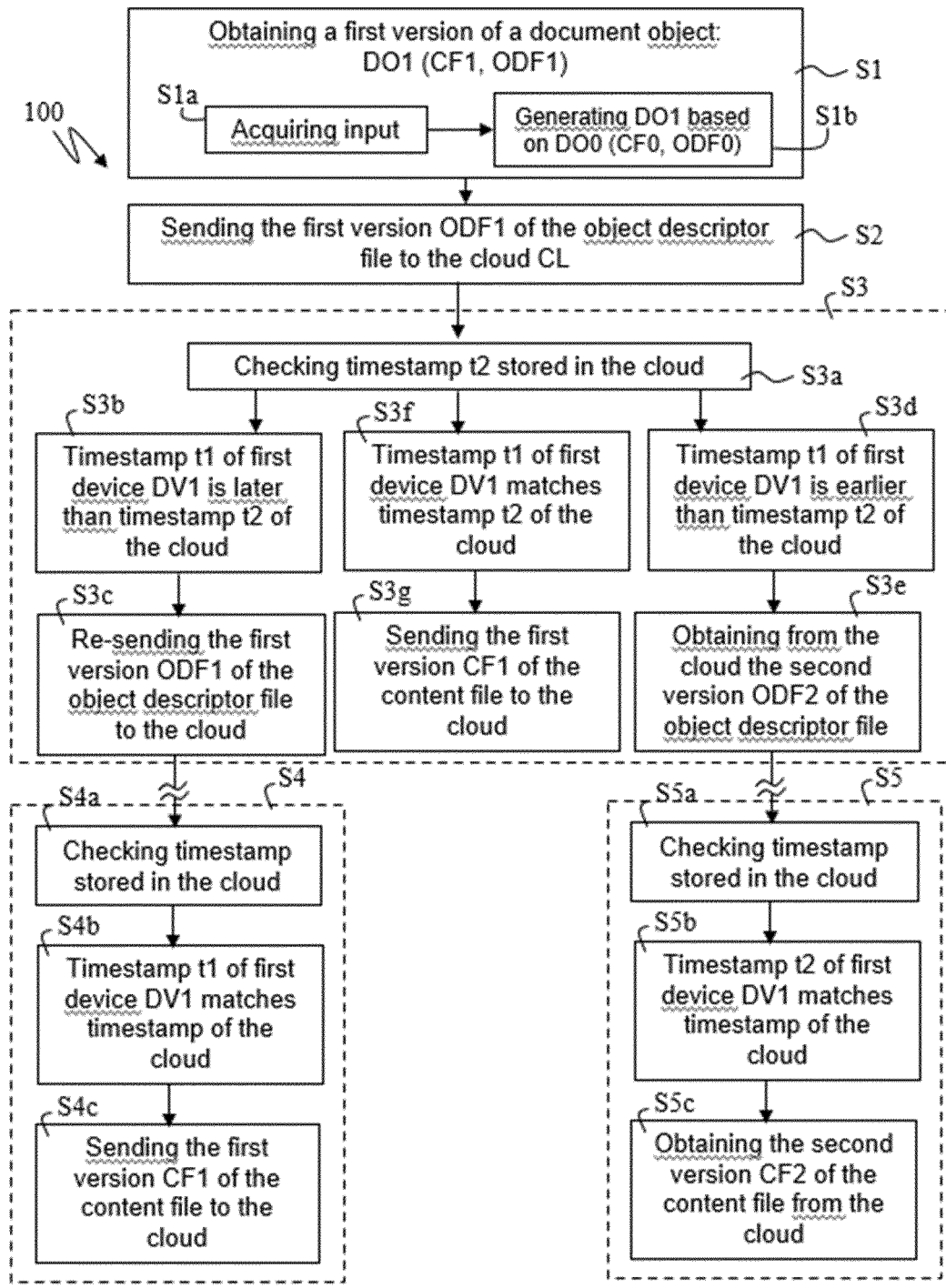
FIG. 3 shows a flow diagram of a method for synchronizing different versions of a document object according to an embodiment of the present invention.
Figure 4:
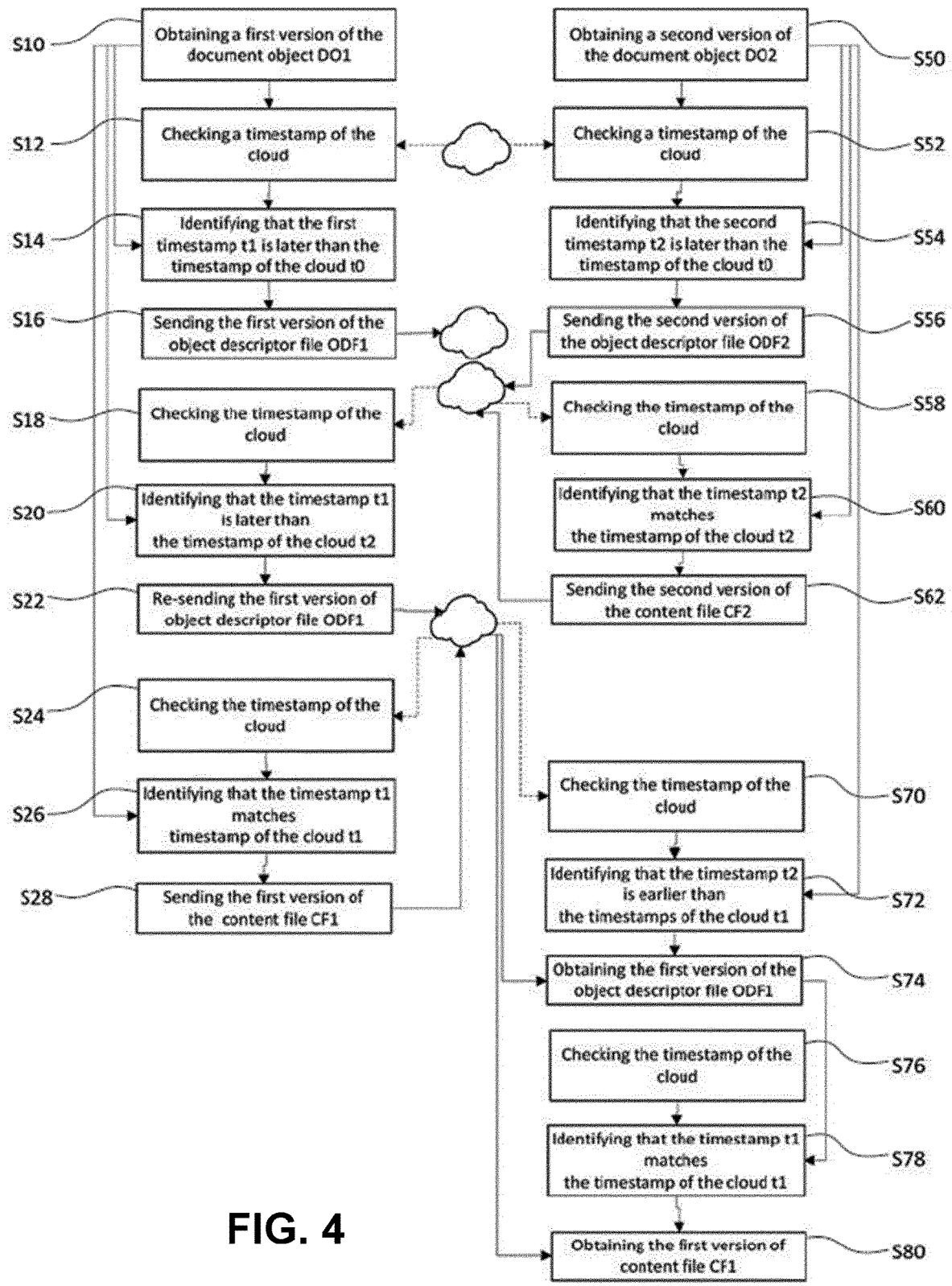
FIG. 4 shows a flow diagram of methods for synchronizing different versions of a document object implemented by two devices cooperating with a cloud according to an embodiment of the present invention.

Methods according to a first exemplary embodiment are described herebelow with reference to FIGS. 3 and 4.

FIG. 3 shows a method 100 implemented by the computing device DV1 for synchronizing different versions of a document object DO, that may be stored by at least two devices DV1, DV2 and a cloud CL, according to a first exemplary embodiment of the invention.

It should be appreciated that a focus is made in FIG. 3 on the method 100 implemented by the first device DV1 (e.g., as previously described with reference to FIGS. 1-2) in cooperation with the cloud CL. The second device DV2 however may operate in the same manner in cooperation with the cloud CL.

In an obtaining step S1, the first device DV1 obtains a first version DO1 of the document object comprising a first version CF1 of the content file and a first version ODF1 of the object descriptor file. The first version ODF1 of the object descriptor file comprises a first object descriptor in association with a first timestamp t1. This first timestamp t1 may define for instance a modification time at which the first version DO1 of the document object was modified or created.

The first version DO1 of the document object may be obtained (S1) in any appropriate manner. For instance, the first device DV1 stores the first version DO1 and retrieves it from its storage in S1. In a particular example, the first device DV1 acquires (S1a) a first handwriting input for modifying an initial version DO0 of the document object which is initially stored by the first device DV1, said initial version DO0 comprising an initial version CF0 of the content file and an initial version ODF0 of the object descriptor file. The first device DV1 may then generate (S1b) the first version DO1 of the document object by updating the initial version DO0 of the document object based on the first handwriting input acquired in S1a.

In a sending step S2, the first device DV1 sends the first version ODF1 of the object descriptor file, independently of the first version CF1 of the content file, to the cloud CL for causing the cloud to store said first version ODF1 of the object descriptor file.

The sending S2 of ODF1 may be performed in various manners, e.g. as part of a synchronization phase (called hereafter initial synchronization phase) carried out by the first device DV1. More specifically, in a particular example, the first device DV1 performs an initial synchronization during which it checks an initial timestamp t0 comprised in the initial version ODF0 of the object descriptor file initially stored in the cloud; if the first timestamp t1 of the first version ODF1 of the object descriptor file of the first device DV1 is later than the initial timestamp t0 of the cloud, the first device DV1 triggers the synchronization by the sending S2 of the first version ODF1 of the object descriptor file to the cloud CL.

After sending (S2) the first version ODF1 of the object descriptor file, the first device DV1 performs a first synchronization phase S3 which comprises a checking step S3a and may further comprise the steps S3b-3c and/or S3d-S3e and/or S3f-S3g as described further below.

This first synchronization phase allows the first device DV1 to determine whether there is a synchronization conflict and to adapt its behavior accordingly.

In a checking step S3a, the first device DV1 checks a timestamp comprised in a version of the object descriptor file currently stored in the cloud CL. At this stage, it is assumed for instance that it is the first version ODF1 of the object descriptor file which is currently stored in the cloud CL. The first device DV1 for instance retrieves (S3a) the first timestamp t1 which is comprised in the first version ODF1 of the object descriptor file currently stored in the cloud CL. A comparison can then be made between the timestamp t1 of the first device DV1 and the timestamp retrieved from the cloud. It should be noted that the current version of the object descriptor file in the cloud CL may have changed since the sending S2 if for instance another computing device has uploaded in the meantime another version of the object descriptor file to the cloud CL.

If the first timestamp t1 of the first version ODF1 of the object descriptor file stored by the first device DV1 is later than the second timestamp of the cloud CL checked in S3a, the first device DV1 detects (S3b) a first document synchronization conflict. It means that the first device DV1 has in storage a more up-to-date version of the document object DO than the cloud CL. The first device DV1 thus resolves this first synchronization conflict by re-sending (S3c) the first version ODF1 of the object descriptor file to the cloud CL for causing said cloud to store said first version ODF1 of the object descriptor file.

By sending again the first version ODF1 of the object descriptor file to the cloud CL, the first device DV1 can force the cloud CL to store this first version ODF1 in replacement of the version of the object descriptor file in the cloud. This first version ODF1 of the object descriptor file indicated in the cloud that it is the first version DO1 of the document object which is the most up-to-date.

In a particular example, the first device DV1 triggers, after the re-sending S3c, a subsequent synchronization phase named S4 which comprises steps S4a, S4b and S4c. The first device DV1 may for instance trigger the new synchronization phase S4 upon detecting that a predetermined delay has lasted since completion of the re-sending step S3c. During this new synchronization phase S4, the first device DV1 checks (S4a) a timestamp (e.g. t1) comprised in a version (e.g. ODF1) of the object descriptor file currently stored in the cloud CL. It should be noted that the current version of the object descriptor file in the cloud CL may have changed since the re-sending S3c if for instance another computing device has uploaded in the meantime another version of the object descriptor file to the cloud CL. If the first timestamp t1 of the first version ODF1 of the descriptor file stored by the first device DV1 matches (S4b) the current timestamp of the cloud checked in S4a, it means that no other version of the object descriptor file has been uploaded to the cloud in the meantime. The first device DV1 thus sends (S4c) the first version CF1 of the content file to the cloud CL for causing said cloud to store said first version CF1 of the content file.

By checking the timestamp t2 stored in the cloud, the first device DV1 can advantageously determine if there is a synchronization conflict and, in the affirmative, can act accordingly to resolve it. In the above example (S3b-S3c and S4a-S4c), a first synchronization conflict arises because the first device DV1 holds a version of the document object which is more up-to-date that the one held in the cloud. Another conflicting situation may however arise when the version of the first device is out-of-date relative to the current version held by the cloud CL, as described below.

In a particular example, still in the first synchronization phase S3 (FIG. 3), if the first timestamp t1 of the first version ODF1 of the object descriptor file stored by the first device is earlier than the current timestamp of the cloud CL checked in S3a, the first device DV1 detects (S3d) a second synchronization conflict. This means that the first device DV1 has in its local storage an older version of the document object DO compared to the version currently stored by the cloud CL. The current version of the object descriptor file in the cloud CL may be more up-to-date for instance if another computing device DV2 has uploaded in the meantime a more recent version of the object descriptor file to the cloud CL. It is assumed in this example that the cloud CL currently stores a second version DO2 of the document object which is more recent than the first version DO1. Accordingly, the first device DV1 performs (S3e) a synchronization with the cloud CL by obtaining (or retrieving) from the cloud CL the second version ODF2 of the object descriptor file, i.e. the version of the object descriptor file currently stored in the cloud CL. This second version ODF2 of the object descriptor file can be stored by the first device DV1.

In one example, the retrieving of the second version ODF2 of the object descriptor file from the cloud CL, by the first device DV1, replaces the older version ODF1 with the more recent version ODF2 which corresponds to the most up-to-date version of the document object DO.

In another example, the first device DV1 retrieves the second version DO2 of the document object currently stored in the cloud CL. Additionally, the first device DV1 obtains (or generates) a copy of the first version DO1 of the document object by duplicating said first version DO1, and sends this copy of the first version DO1 to the cloud CL for causing storing of this copy by the cloud CL. Therefore, the first device DV1 stores (or keeps in storage) the first and second versions DO1, DO2 of the document object. In particular, this is performed to avoid any data loss. The cloud CL is being provided with a copy of the local version held by the first device DV1 while said first device DV1 keeps in memory both versions which may be later handled in any appropriate manner. A user may indeed prefer to keep either the first, or the second version, or both at the same time. The second synchronization conflict can thus be resolved since it has been detected at the level of the first device DV1 that OD2 is the most up-to-date version of the document object.

In a particular example, after obtaining in S3e the second version ODF2 of the object descriptor file, the first device DV1 triggers a subsequent synchronization phase S5 comprising steps S5a, S5b and S5c. The first device DV1 may for instance trigger the synchronization phase S5 upon detecting that a predetermined delay has lasted since completion of the obtaining step S3e. In this new synchronization phase S5, the first device DV1 checks (S5a) a timestamp (e.g. t2) comprised in a version (e.g. ODF2) of the object descriptor file currently stored in the cloud CL. To this end, the first device DV1 for instance retrieves the current timestamp of the cloud. A comparison can thus be performed between the second timestamp t2 currently stored in the first device DV1 and the timestamp retrieved from the cloud in S5a.

It should be noted that the current version of the object descriptor file in the cloud CL may have changed since the obtaining S3e if for instance another computing device has uploaded in the meantime another version of the object descriptor file to the cloud CL. If the second timestamp t2 of the second version ODF2 of the descriptor file stored by the first device DV1 matches (S4b) the current timestamp of the cloud checked in S5a, it means that no other version of the object descriptor file has been uploaded to the cloud in the meantime.

It is assumed in the present example that the cloud CL still has in storage the second version ODF2 of the object descriptor file such that the first device DV1 retrieves in S5a the second version ODF2 of the object descriptor file and detects in S5b that the timestamp in the retrieved object descriptor file matches the timestamp t2 previously obtained in S3e. In this case, the first device DV1 performs a synchronization with the cloud by obtaining (S5c) from the cloud CL the second version CF2 of the content file for storing said second version CF2 of the content file by the first device DV1.

By obtaining and storing the second version CF2 of the content file from the cloud CL, synchronization is performed since the first device DV1 now holds in storage the most up-to-date version of the document object.

As previously indicated, the first and second devices DV1, DV2 of the system SY1 (FIGS. 1-2) may both perform the method 100 (FIG. 3) in the same manner. Accordingly, each device may manage, modify and/or store various versions of the document object DO and achieve synchronization as previously described.

FIG. 4 shows an example where both the first and second devices DV1, DV2 perform a method in cooperation with the cloud CL for synchronizing different versions of the document object DO in accordance with particular implementations of the method 100 shown in FIG. 3.

It is first considered that the first and second devices DV1, DV2 and the cloud CL are in an initial state, i.e. at a settled phase, where these two devices and the cloud share (i.e. store) an initial version (or initial common version) DO0 of the document object DO. In this example, the initial version DO0 of the document object DO comprises an initial version CF0 of the content file CF and an initial version ODF0 of the object descriptor file ODF, wherein the initial version ODF0 of the object descriptor file ODF includes an object descriptor OB0 of initial value (of the content v0) in association with an initial timestamp t0.

In an obtaining step S10, the first computing device DV1 obtains an updated version of the initial document object DO as a first version DO1 of the document object DO. In a particular example, this first version DO1 is different from the initial version DO0 of the document object DO. For example, the first computing device acquires a first handwriting input on the content of the initial document object DO0. The first handwritten input may be input by a user using the first input interface 4a of the first device for modifying the content of the initial document object.

Similarly, in an obtaining step S50, the second computing device DV2 obtains an updated version of the initial document object DO as a second version DO2 of the document object DO. In a particular example, this second version DO2 is different from the initial version DO0 of the document object DO. This second version DO2 may, or may not, be different from the first version DO1. For example, the second computing device acquires a second handwriting input on the content of the initial document object DO0. The second handwritten input may be input by a user using the second input interface 4b of the second device for modifying the content of the initial document object.

In a particular example, the first and/or the second handwriting inputs are formed by at least one input stroke. In the present disclosure, an input stroke is characterized by at least a stroke initial location (corresponding to a "pen down" event), a stroke terminal location (corresponding to a "pen up" event), and the path connecting the stroke initiation and the stroke terminal locations. A handwriting application 12 run by the computing devices may allow generating handwritten or hand-drawn content (e.g., text, diagrams, charts, shapes, drawings, or any kind of text and/or non-text handwriting input) in digital ink form. This content may be faithfully recognized using a recognition engine 14. The first and the second handwritten input are detected on the input interfaces 4a and 4b of the first and second devices, respectively.

This detection may occur while the content of the initial version of the document object DO0 is being displayed on displays 5a and 5b of the first and second devices, respectfully.

In a generating stage of the obtaining step S10, the first device DV1 recognizes the first handwriting input by performing handwriting recognition, for instance by using the recognition engine 14a of the first device, thereby generating a first updated version of the content file CF1. Similarly, in a generating stage of the obtaining step S50, the second device DV2 recognizes the second handwriting input by performing handwriting recognition, for instance by using the recognition engine 14b of the second device, thereby generating a second updated version of the content file CF2.

In a particular example, during the recognition of the first and the second handwriting input, the first and second computing devices DV1, DV2 each make use of the recognition engines 14a and 14b providing so-called 'on-the-fly' or incremental handwriting recognition to recognize the first and the second handwritten input respectively to the first and the second device. This recognition processes the handwriting input to recognize content arisen thereby.

Incremental recognition may be performed by parsing the (pre-processed) strokes to the recognizer as they are received and the recognizer processing groups of the strokes to output recognition results, even as input continues, where the results may be substantially immediately provided in the form of typesetting of the digital ink or displayed recognition candidates, or merely stored by the document management system for later use, e.g., by using the memory of the first device. The first and the second handwriting inputs acquired on the content of the initial document object DO0, lead to modifications of the initial version of the content file CF0 stored by the first and the second devices. In response to these modifications, the first and second devices generate respectively new (updated) versions of the document object DO1 and DO2 which comprises new (updated) versions of the content file CF1 and CF2.

In a particular example, in response to a recognition result based on the first handwriting input, the first device generates (and possibly displays) the first updated version CF1 of the content file CF. Similarly, in response to a recognition result based on the second handwriting input, the second device generates (and possibly displays) the second updated version CF2 of the content file CF (e.g., different from the first version CF1). In such an example, display of the digital ink and/or the typeset ink may occur during input at specified times, e.g., system and/or user specified, or may occur at a time after input on the same or different display areas, for example. The way the handwriting input is displayed by the first and second devices may be adapted depending on each case. In a particular example, no display is necessary for the first and second devices to perform the obtaining steps S10 and S50.

In a particular example, in the generating stage of the obtaining step S10, the first device DV1 replaces (or updates), in the initial version ODF0 of the object descriptor file ODF, the object descriptor OB0 of the initial value v0 associated with the initial timestamp t0 by an object descriptor OB1 of a first value v1 of the content associated with a first timestamp t1 to generate a first updated version ODF1 of the object descriptor file ODF. In this example, t1 defines an instant later than t0.

Similarly, in the generating stage of the obtaining step S50, the second device may replace (or update), in the initial version ODF0 of the object descriptor file ODF, the object descriptor OB0 of the initial value v0 associated with the initial timestamp t0 by an object descriptor OB2 of a second value v2 of the content associated with a second timestamp t2 to generate a second updated version ODF2 of the object descriptor file ODF, wherein the second timestamp t2 is earlier than the first timestamp t1 (but later than t0).

In an exemplary embodiment, the first timestamp t1 of the object descriptor OB1 of the first object descriptor file ODF1 corresponds to an instant (or time) when the first handwriting input is converted into the updated content of the first version CF1 of the content file CF by the first computing device DV1. The second timestamp t2 of the object descriptor OB2 of the second updated version ODF2 of the object descriptor file corresponds to an instant (or time) when the second handwriting input is converted into the updated content of the second version CF2 of the content file CF by the second computing device DV2.

In a particular example, the updated versions DO1 and DO2 of the document object made by the first and the second devices DV1 and DV2 are shared (or transmitted) through the network to the cloud CL upon synchronization of the updated versions ODF1 and ODF2 of the object descriptor file and the updated versions CF1 and CF2 of the content file. The first and second devices may provide communication interface with the server over the network to store the latest updated versions of the object document in the two devices. The interface is configured to send and receive signals in a number of different protocols using operating systems 10a and 10b.

In the present embodiment, the updated versions DO1 and DO2 of the document object are synchronized by the first and second devices DV1, DV2 by sending updated versions of the document object to the cloud in multiple phases, wherein the updated versions ODF1 and ODF2 of the object descriptor file are synchronized independently of the updated versions CF1 and CF2 of the content file.

A first synchronization phase S12-S16, at the first device for synchronizing the first version ODF1 of the object descriptor file, may include several synchronization steps such as a checking step S12, an identification step S14 and a transfer step or sending step S16.

A second synchronization phase S52-S56 at the second device for synchronizing the second version ODF2 of the object descriptor file, may include several synchronization steps such as a checking step S52, an identification step S54 and a transfer step or sending step S56.

In certain circumstances, the first synchronization phase of the first version ODF1 of the object descriptor file at the first device may overlap with the second synchronization phase of the second version ODF2 of the object descriptor file at the second device, generating a synchronization conflict.

For example, the checking steps of the first and the second synchronization phases S12 and S52, triggered at routine check times of the first and the second devices, occur within very short time laps and before the sending steps of the first and the second synchronization phases S16 and S56 of the first and the second device, respectively. Therefore, both the first timestamp t1 and the second timestamps t2 of the updated versions of the object descriptor files ODF1 and ODF2 of the first and the second devices DV1, DV2 are identified as later than the timestamp t0 of the initial version ODF0 of the object descriptor file at the cloud.

In an identifying step S14, the first timestamp t1 of the first version of the object descriptor file ODF1 is compared with the timestamp t0 of the object descriptor file version of the cloud ODF0. The first device DV1 identifies (or determines) that the first timestamp t1 of the first updated version of the object descriptor file is later than the initial timestamp t0 of object descriptor file version of the cloud.

Similarly, in an identifying step S54, the second timestamp t2 of the second updated version of the object descriptor file ODF2 is compared with the timestamp t0 of the object descriptor file version of the cloud ODF0. The second computing device DV2 identifies (or determines) that the second timestamp t2 is later that the common timestamp t0 of the object descriptor file version of the cloud.

Since the timestamp t0 of object descriptor file version of the cloud is earlier than the first timestamp t1 and of the second timestamp t2, the synchronization phases further include respectively sending steps S16 and S56 as described below.

The first and the second devices DV1 and DV2 trigger respectively data transfer steps S16 and S56 to the cloud to replace the object descriptor file version of the cloud ODF0.

In the sending step S16, the first device DV1 sends the first version of object descriptor file ODF1 to the cloud CL to replace the initial version of the object descriptor file ODF0.

Nevertheless, it is assumed that the sending step S16 occurs in this example after completion of the sending step S56. Therefore, in the sending step S56, the second computing device DV2 sends the second version of the object descriptor file ODF2 to the cloud CL, thereby causing overwriting of the first updated version of the object descriptor file ODF1 at the cloud.

A synchronization conflict thus occurs at the sending step S56. The second version of the object descriptor file ODF2 overwrites the first version of the object descriptor file ODF1 at the cloud whereas the second timestamp t2 of the object descriptor OB2 is earlier than the first timestamp t1 of object descriptor OB1. Therefore, the object descriptor file version of the cloud does not include the latest updated value v1 and the latest timestamp t1 of the content.

In a particular embodiment, storing of the second version of the content file CF2 at the cloud may be triggered in response to the sending S56 of the second updated version of the object descriptor file ODF2.

Further, the second device DV2 may perform a re-checking step S58, an identification step S60 and a content file sending step S62 as described below.

During a re-checking step S58, a version of object descriptor file currently stored in the cloud CL is checked. It is assumed in the present example that it is the second version of object descriptor file ODF2 which is currently stored in the cloud CL. Accordingly, the current timestamp t2 of the object descriptor file version ODF2 at the cloud may be re-checked. In the identifying step S60, the second timestamp t2 at the cloud may be compared with the timestamp t2 at the second device. The second computing device DV2 may identify that the second timestamp t2 at the first device equals the timestamp t2 at the cloud, wherein the timestamp t2 at the cloud has been updated by the second device at the sending step S56.

Therefore, in the sending step S62, the second device DV2 may send to the cloud CL the second version of the content file CF2 replacing the initial version of the object descriptor file ODF0.

The second version DO2 of the document object may thus be updated at the cloud CL including the storage of the second version ODF2 of object descriptor file and the second version CF2 of the content file at the cloud CL, even though the timestamp t2 of the object descriptor of the second version of the document object DO2 is not the latest version (synchronization conflict).

However, further steps of the method may be performed according to particular embodiments of the present invention for resolving the synchronization conflict. Resolving the synchronization conflict occurring at the sending step S56 may be processed by repeating the object descriptor file synchronizing steps of the first device, as described below.

A third synchronization phase S18-S22 at the first device DV1 may be performed by the first device DV1 for synchronizing the first version ODF1 of the object descriptor file, wherein this third synchronization phase includes several synchronization steps such as a checking step S18, an identification step S20 and a transfer step or re-sending step S22.

During the checking step S18 of the third synchronization phase at the first device DV1, the timestamp t of the object descriptor file version currently stored in the cloud CL is checked (i.e. timestamp t1 in this case).

In the identifying step S20, the first timestamp t1 of the first version of the object descriptor file ODF1 stored in the first device DV1 is compared with the timestamp t2 of the second version of the object descriptor file ODF2 obtained in S18 from the cloud CL. The first computing device DV1 identifies (determines) that the first timestamp t1 of the first version ODF1 of the object descriptor file of the first device DV1 is later than the timestamp t2 of the object descriptor file version ODF2 at the cloud CL, wherein the timestamp of the object descriptor file version at the cloud CL has been updated during the second synchronization phase at the second device DV2 with the second timestamp t2 of the second version ODF2 of the object descriptor file of the second device DV2.

Upon detecting (S20) that the timestamp t2 of the object descriptor file version ODF2 at the cloud CL is different from (earlier than) the first timestamp t1, the first device DV1 carries on with step S22 in the third synchronization phase as described below.

In a re-sending step S22, the first device DV1 sends (i.e. re-sends) the first version ODF1 of the object descriptor file to the cloud CL to replace the second version ODF2 of the object descriptor file at the cloud. Although the first version ODF1 of the object descriptor file was already sent to the cloud at step S16, it is re-sent to resolve the synchronization conflict detected by the first device DV1 in identifying step S20.

Subsequently, a new synchronization phase S24-S28 may be performed by the first device DV1. In a checking step S24, the first device DV1 retrieves the current timestamp of the cloud CL, i.e. timestamp t1 comprised in the first version ODF1 of the object descriptor file currently stored in the cloud CL. The first timestamp t1 of the first device DV1 can then be compared with the timestamp of the cloud retrieved in S24. Upon detecting (S26) that the timestamp t1 of the cloud matches the timestamp of the cloud retrieved in S24, the first device DV1 sends (S28) the first version CF1 of the content file to the cloud for causing the cloud CL to store said first version CF1 of the content file.

Subsequently, a fourth synchronization phase S70-S80 performed by the second device DV2 includes a checking step S70, an identifying step S72 and an object descriptor file transfer step or obtaining step S74, a checking step S76, an identifying step S78, and a content file transfer step or obtaining step S80.

During the checking step S70 of the fourth synchronization phase at the second device DV2, the timestamp t of the object descriptor file version currently in the cloud CL is checked (i.e. timestamp t2 in this case).

In the identifying step S72, the second timestamp t2 of the second version ODF2 of the object descriptor file stored in the second device DV2 is compared with the timestamp t1 of the object descriptor file version at ODF1 obtained in S70 from the cloud CL. The second computing device DV2 identifies (determines) that the second timestamp t2 at the second device DV2 is earlier than the first timestamp t1 at the cloud CL.

Upon detecting (S72) that the timestamp t1 of the object descriptor file version ODF1 currently stored in the cloud CL is earlier than the second timestamp t2 currently stored in the second device, the second computing device DV2 carries on with step 74 in the fourth synchronization cycle as described below.

In an obtaining step S74, the second computing device DV2 obtains the first version ODF1 of the object descriptor file version from the cloud CL and stores said first version ODF1 in replacement of the second version ODF2 of the object descriptor file. As a result, the first version ODF1 of the object descriptor file including the object descriptor of the first value v1 of the content and the first timestamps t1 is now stored in the cloud CL and in the second device DV2.

Once the first version ODF1 of the object descriptor file has been obtained (S74), the second device DV2 obtains from the cloud CL, and stores, the first version CF1 of the content file (corresponding to the object descriptor file ODF1). To this end, the second device DV2 may perform a re-checking step S76, an identification step S78 and a content file obtaining step S80.

More specifically, during a re-checking step S76 of the object descriptor file version at the cloud CL, a current timestamp t of the object descriptor file version currently stored in the cloud CL is re-checked (i.e. the timestamp t1 in this case). In the identifying step S78, the first timestamp t1 obtained from the cloud CL is compared with the timestamp t1 stored in the second device DV2. The second computing device DV2 identifies (determines) that the first timestamp t1 at the second device DV2 equals (or corresponds to) the current timestamp t1 at the cloud CL, wherein the current timestamp t1 at the second device DV2 has been previously updated at the obtaining step S74 as previously described. Accordingly, in the obtaining step S80, the second device DV2 retrieves the first version CF1 of the content file from the cloud CL and stores said first version CF1 in replacement of the second version CF2 of the object DO2.

As a result, the first version DO1 of the document object has now been updated at the second device DV2, this including the storage of the first version ODF1 of object descriptor file and the first version CF1 of the content file. The first version DO1 of the document object is synchronized and stored in the first device DV1, the cloud CL and the second device DV2, this first version DO1 including the first version ODF1 of the object descriptor file and the first version CF1 of the content file. The synchronization conflict detected in S20 by the first device DV1 is thus resolved in the sense that the most up-to-date version of the document object DO is now stored and shared by the computing devices DV1, DV2 and the cloud CL.

The two devices and the cloud reach an updated settled phase with an updated version of the document object DO including an updated value v1 and an updated timestamp t1.

The present invention thus provides an efficient solution for managing and sharing different versions of a document object over one or multiple devices cooperating with a cloud (or at least one server), so that the most up-to-date version of a document object can be maintained in a cloud-based environment in an efficient and reliable manner without data loss. In particular, the risk of the cloud or a computing device having in storage an out-of-date version of a document object can be limited by resolving synchronization conflicts in accordance with the present invention.

In particular, synchronization conflicts can be avoided or resolved in one or multiple computing devices, irrespective of the technology implemented by said devices since the processing resources involved is mainly implemented in the computing devices, instead of being implemented in the cloud as in conventional cloud-based systems. The present invention thus provides a technology-agnostic solution for synchronizing efficiently different versions of a document object in a system of multiple devices cooperating with a cloud.

Although the first exemplary embodiment described above allows synchronization with high performances and reliability, it has been observed some rare and exceptional cases where a file inconsistency occurs, during a synchronization method performed by at least one computing device. A file inconsistency is a file mismatch conflict occurring in a document object, that is, when the object descriptor file and the content file of the document object do not match. The version of the document object and the version of the object descriptor file may for instance be different when a file inconsistency occurs in the cloud. The origin of a file inconsistency may vary depending on each case.

When implementing the above-described first exemplary embodiment of the present invention, the file inconsistencies that may occur are in most cases transient, i.e. they can be solved by resolving a synchronization conflict as previously described. Such transient file inconsistencies may occur, for example, in steps S16, S56 and S22 (FIGS. 4-5) when the versions of the object descriptor file are successively ODF1, ODF2 and ODF1 whereas the version of the content file is CF0. The transient inconsistency is resolved at step S28 by the first device DV1 sending (S28, FIGS. 4-5) to the cloud CL the first version of the content file CF1 (e.g. including the content {Z}) which matches the version ODF1 of the object descriptor file stored in the cloud. Each device DV1, DV2 may resolve this first synchronization conflict by re-sending (S22) the object descriptor file before sending (S28) the matching version of the content file to the cloud, as previously described.

However, it has been observed that the synchronization conflict resolution may not succeed in resolving file inconsistencies which thus constitute persistent (or permanent) inconsistencies. a persistent file inconsistency may not be resolved by one or more devices implementing a method according to the first exemplary embodiment as described earlier. Indeed, the devices may not be able to restore a file consistency, and still overwrite versions of the matching files stored by the devices before resolving the file inconsistency. Therefore, the cloud may not be updated with the correct version of the devices. Further discussion on persistent file inconsistencies is set out further below.

According to another implementation of the first exemplary embodiment, at the second device, when the second version of the document object DO2 is replaced by the first version of the document object DO1, the user may be asked to choose between three different options. The first option is to keep both updated versions of the document object DO1 and DO2 by creating two new document objects and their unique identifiers. Both the first and the second versions of the document object DO1 and DO2 will be kept, at the second device, as child document objects of the initial version of the document object DO0. The new child document objects DO1 and DO2 will be further synchronized as two different document objects. The second option is to discard the cloud version of the document object DO1 by replacing the second version of the document object DO2 at the cloud. The third option is to discard the second version of the document object DO2 by replacing the cloud version of the document object DO1 at the second device.

Figure 5:
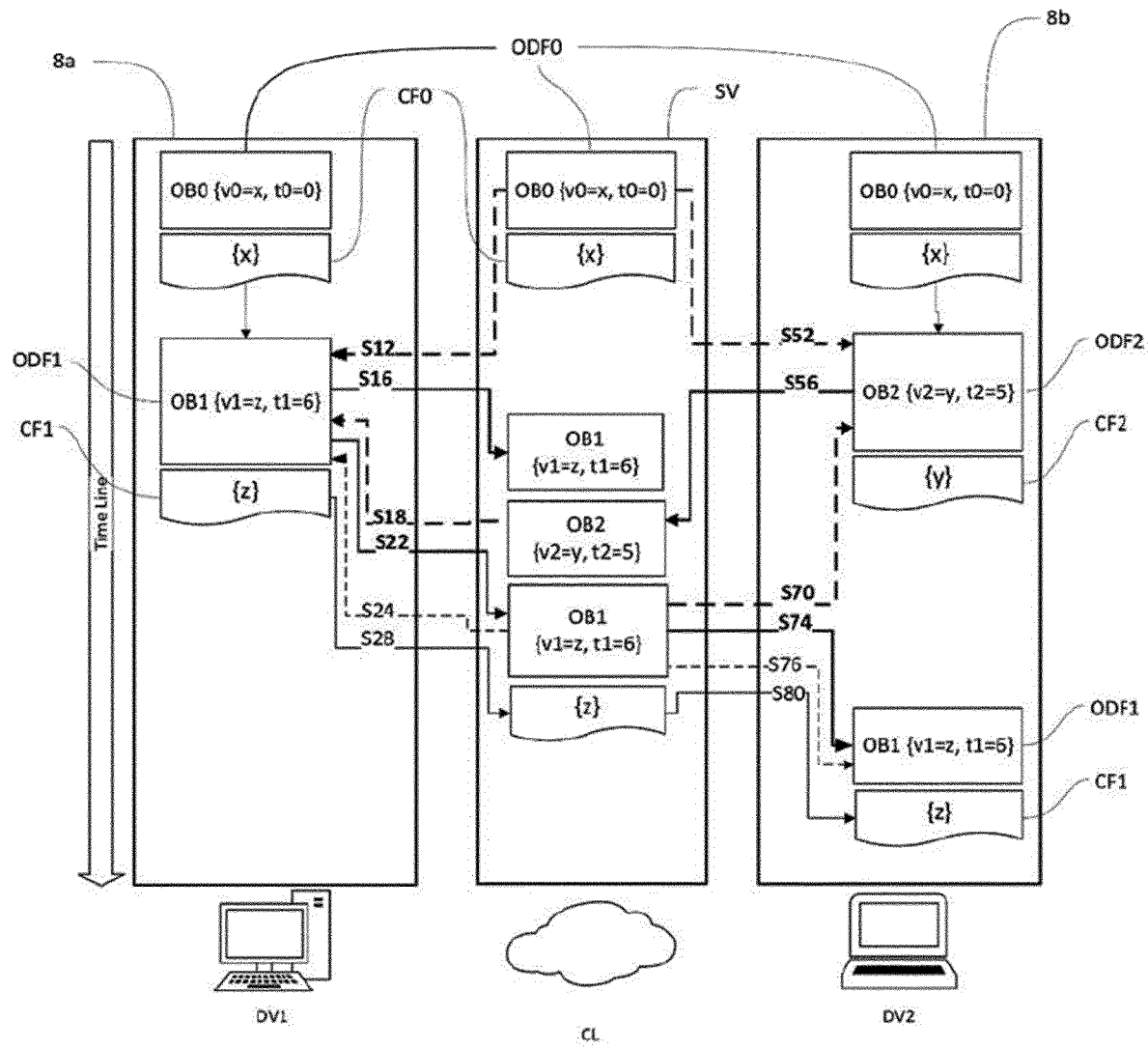
FIG. 5 shows a schematic view of a synchronization conflict occurring during overlapping synchronization cycles of a first and a second device and the resolution of the synchronization conflict according to an embodiment of the present invention.

FIG. 5 illustrates an example of a synchronization conflict resolution occurring over two updated versions, DO1 and DO2, of an initial document object DO0 comprising an initial content file CF0 and an object descriptor file ODF0. The content file CF0 comprises a content {X} and the object descriptor file ODF0 comprises an object descriptor OB0 defining said content by a value 'v0=x' and a timestamp 't0=0', wherein the timestamp defines a time of the latest modification of the object descriptor (e.g. latest modification of the value of object descriptor).

At an initial phase, the initial document DO0 is stored in the memories 8a and 8b of the two devices DV1 and DV2 and on a server SV of the cloud CL. The two devices DV1 and DV2 are equipment including user input interfaces and display interfaces such as a computer device, a laptop, a tablet, or a smart phone. The two devices are connected to a cloud through a network.

Then, the first device DV1 acquires a first input for modifying the content {X} of the initial version of the document object leading to a first updated content {Z} at the first device DV1. The first device DV1 generates a first version of the document object DO1 comprising a first version of the content file CF1 and a first version of the object descriptor file ODF1. The first version of the object descriptor file ODF1 comprises a first object descriptor OB1 defined by a first value of the content 'v1=z' in association with a first timestamp 't1=6'. Similarly, the second device DV2 acquires a second input for modifying the content {X} of the initial version of the document object leading to a second updated content {Y} at the second device DV2.

The second device DV2 generates a second version of the document object DO2 comprising a second version of the content file CF2 and a second version of the object descriptor file ODF2.

The second version of the object descriptor file ODF2 comprises a second object descriptor OB2 defined by a second value of the content 'v2=y' in association with a first timestamp 't2=5'.

At a first synchronization phase, the first device is checking S12 the timestamp of the current object descriptor of the cloud OB0 associated with the value 'v0=x' and the timestamp t0=0. Therefore, the timestamp of the first updated version 't1=6' at the first device DV1 is later than the timestamp at the cloud 't0=0' and the first device is sending S16 this first version of the object descriptor file ODF1 to the cloud independently from the first version of the content file CF1.

At the cloud, during the first synchronization phase, the initial version of the object descriptor file ODF0 is replaced by the first version of the object descriptor file ODF1.

A second synchronization phase of the second device DV2 is overlapping with the first synchronization phase of the first device and generating a synchronization conflict. The second device DV2 is checking the timestamp of the current object descriptor file of the cloud OB0 associated with the value 'v0=x' and the timestamp t0=0 before the sending step S16 of the first version of the object descriptor file ODF2 to the cloud. Therefore, the second device identifies that the second timestamp t2=5 at the second device DV2 is later than the timestamp 't0=0' at the cloud. Therefore, the second device is sending S56 the second version of the object descriptor file ODF2 to the cloud independently from the second version of the content file CF2. However, the sending step S56 of the second device DV2 is performed after the sending step S16 of the first device DV1. Therefore, the second version of the object descriptor file ODF2 overwrites the first version of the object descriptor file ODF1 at the cloud, although the second timestamp t2=5 is earlier than the first timestamp t1=6, generating the synchronization conflict.

In response to the sending step S16 of the first synchronization phase, a third synchronization phase of the first device DV1 is performed to complete the synchronization of the first version of the document object.

The first device is checking S18 the timestamp of the current object descriptor of the cloud OB2 associated with the value 'v2=y' and the timestamp 't2=5'. But, the timestamp of the first updated version 't1=6' of the first device DV1 is later than the timestamp 't2=5' at the cloud therefore, the first device is re-sending S22 this first version of the object descriptor file ODF1 to the cloud. Although the first version of the object descriptor file ODF1 was already sent by the first device DV1 to the cloud, the first device is resolving the synchronization conflict by re-sending the first object descriptor file ODF1.

At the cloud, during the third synchronization phase, the second version of the object descriptor file ODF2 is replaced by the first version of the object descriptor file ODF1.

In response to the re-sending step S22 of the third synchronization phase, the first device DV1 completes the synchronization of the first version of the document object.

The first device is checking S24 the timestamp of the current object descriptor OB1 of the cloud associated with the value 'v1=z' and the timestamp 't1=6'. Favorably, the timestamp of the first updated version 't1=6' at the first device DV1 is the same at the cloud therefore, the first device is sending S28 the first version of the content file CF1 including the content {Z} to the cloud. Although the first version of the object descriptor file ODF1 was already sent by the first device DV1 to the cloud, the first device resolved the synchronization conflict by re-sending the first object descriptor file ODF1 before being able to send the first version of the content file CF1 to the cloud. The first device DV1 is saving time and enhancing reliability by transferring the first version of the object descriptor file ODF1 independently from the first version of the content file CF1. The first device is resolving the synchronization conflict arising at the first synchronization phase of smaller sized files, such as object descriptor files, before enabling the transfer of larger sized files, such as content file, and saving network bandwidth and improving reliability.

In response to the sending step S56 of the second synchronization phase, a fourth synchronization phase of the second device DV2 is performed to complete the synchronization of the second version of the document object.

The second device is checking S70 the timestamp of the current object descriptor of the cloud OB1 associated with the value 'v1=z' and the timestamp 't1=6'. But, the timestamp of the first updated version 't1=6' at the cloud is later than the timestamp 't2=5' at the second device DV2 therefore, the second device is obtaining S74 this first version of the object descriptor file ODF1 from the cloud. Although the second version of the object descriptor file ODF2 was already sent by the second device DV2 to the cloud, the second device is resolving the synchronization conflict by updating the first object descriptor file ODF1 at the second device DV2.

At the second device, during the fourth synchronization phase, the second version of the object descriptor file ODF2 is replaced by the first version of the object descriptor file ODF1.

In response to the obtaining step S74 of the fourth synchronization phase, the second device DV2 completes the synchronization of the first version of the document object.

The second device is checking S76 the timestamp of the current object descriptor of the cloud OB1 associated with the value 'v1=z' and the timestamp 't1=6'. Favorably, the timestamp of the first updated version 't1=6' at the cloud is the same than the timestamp at the second device DV2 therefore, the second device is obtaining S80 the first version of the content file CF1 from the cloud.

At the second device, during the fourth synchronization phase, the second version of the content file CF2 including the content {Y} is replaced by the first version of the content file CF1 including the content {Z}.

The first version of the document object DO1 is stored at the first and the second device and the cloud. The devices are synchronized.

Persistent File Inconsistency

As previously indicated, a persistent (or permanent) file inconsistency may not be resolved by the devices DV1, DV2 implementing the method 100 according to the first exemplary embodiment. Indeed, the devices may not be able to restore consistency, and still overwrite versions of the matching files at the devices before resolving the inconsistency. Therefore, the cloud CL may not be updated with the correct version of the devices.

Figure 6:
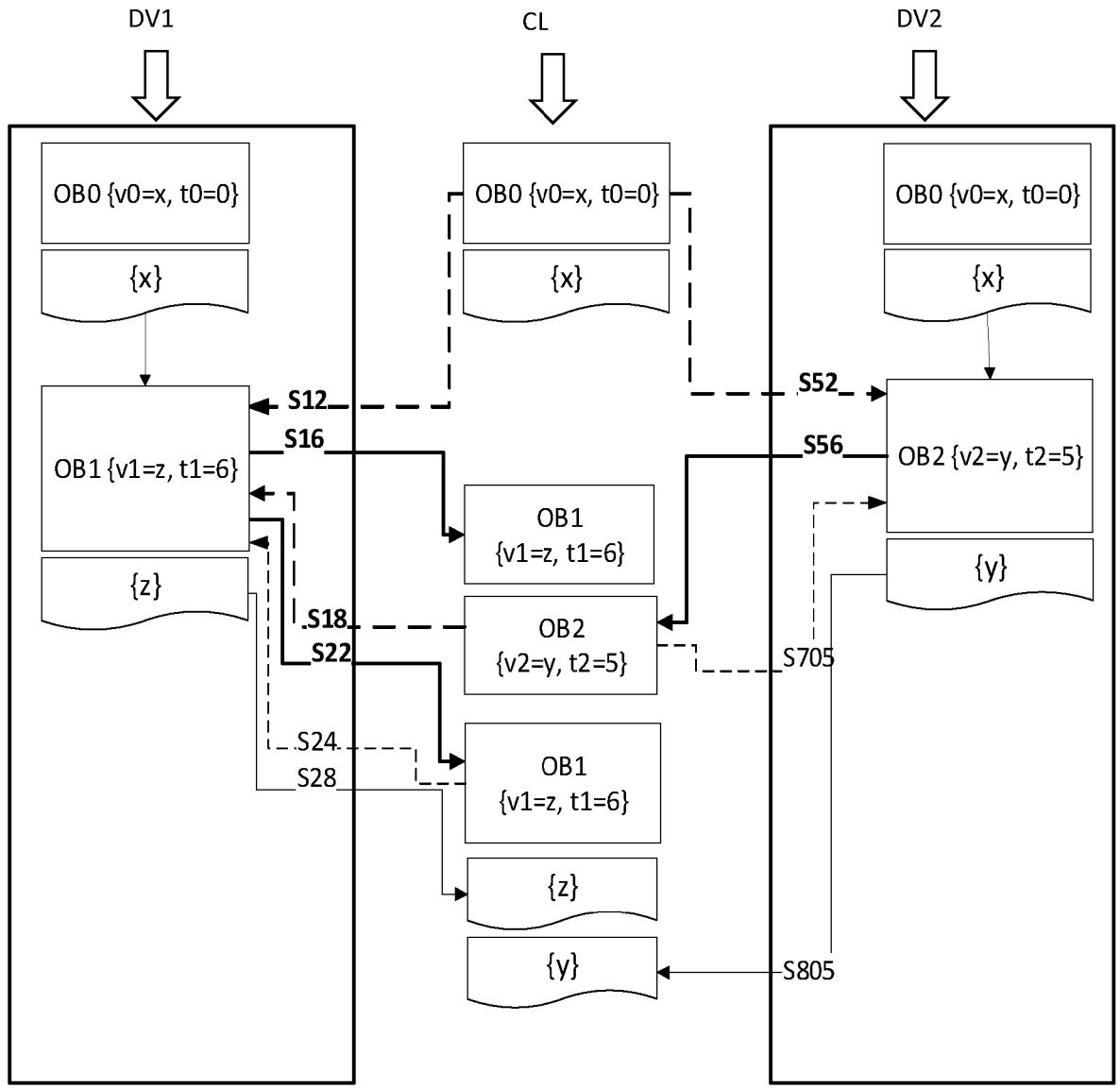
FIG. 6 shows a schematic view of a persistent file inconsistency occurring while the first device DV1 and the second device DV2 perform the method 100 shown in FIG. 3 in cooperation with the cloud CL in accordance with an embodiment of the present invention.

For illustrative purpose, FIG. 6 depicts a persistent file inconsistency occurring while the first device DV1 and the second device DV2 perform the method 100 in cooperation with the cloud CL in accordance with the first exemplary embodiment. A different outcome of the synchronization is reached (relative to the examples of FIGS. 4-5) because there is an overlap over time of the third and a fifth synchronization phases as detailed below.

FIG. 6 shows the same two updated versions, DO1 and DO2, of the initial document object DO0. At the first synchronization phase, the first device checks S12 the timestamp of the current object descriptor file ODF0 of the cloud CL. At the cloud, during the first synchronization phase, the initial version of the object descriptor file ODF0 is replaced in S16 by the first version ODF1 of the object descriptor file.

The second synchronization phase of the second device DV2 overlaps in time with (is performed in parallel with) the first synchronization phase of the first device DV1, thereby leading to synchronization conflict. The second device DV2 checks (S52) the timestamp of the current object descriptor file ODF0 of the cloud CL before the sending step S16 of the first version ODF1 of the object descriptor file to the cloud CL. However, in this particular case, the sending step S56 of the second device DV2 is performed after the sending step S16 of the first device DV1.

In response to the sending step S16 of the first synchronization phase, a third synchronization phase of the first device DV1 is performed to complete the synchronization of the first version DO1 of the document object.

The first device checks in S18 the timestamp of the current object descriptor ODF2 of the cloud CL and re-sends in S22 this first version of the object descriptor file ODF1 to the cloud to resolve the synchronization conflict created by the second synchronization phase of the second device.

At the cloud, during the third synchronization phase, the second version ODF2 of the object descriptor file is replaced by the first version ODF1 of the object descriptor file.

In response to the re-sending step S22 of the third synchronization phase, the first device DV1 completes the synchronization of the first version DO1 of the document object. The first device DV1 checks in S24 the timestamp of the current object descriptor file ODF1 of the cloud CL and sends in S28 the first version CF1 of the content file including the content {Z} to the cloud CL.

In response to the sending step S56 of the second synchronization phase, a rare occurrence of the fourth synchronization phase of the second device DV2 may be performed when completing the synchronization of the second version DO2 of the document object. This rare occurrence results from an overlapping in time (simultaneousness) of the fourth synchronization phase of the second device DV2 with the third synchronization phase of the first device DV1, this generating a second synchronization conflict as described below.

The second device checks in S705 the timestamp of the current object descriptor file ODF2 of the cloud CL before the re-sending step S22 of the third synchronization phase of the first device DV1 is completed. Therefore, the timestamp of the second updated version at the second device DV2 is the same as at the cloud CL and, the second device is sending in S805 the second version CF2 of the content file to the cloud CL after the sending S28 of the first version CF1 of the content file by the first device DV1.

This rare occurrence of the fourth synchronization phase of the second device DV2 causes the checking S705 of the current object descriptor of the cloud to be performed before the re-sending S22 of the first version ODF1 of the object descriptor file by the first device DV1.

Additionally, the sending S805 of the second version CF2 of the content file by the second device DV2 is performed after the sending S28 of the first version CF1 of the content fille by the first device DV1.

As a result, the first version DO1 of the document object is still stored by the first device DV1 and the second version DO2 of the document object is still stored by the second device.

However, a file inconsistency (or file mismatch conflict) results from the fact that the cloud CL now stores the first version ODF1 of the object descriptor file in association with the second version CF2 of the content file. Accordingly, the devices DV1 and DV2 are not synchronized, and a persistent file inconsistency is generated since there is a significant risk that the mismatch between the version of the object descriptor and the one of the content file will persist. In particular, the first device DV1 may not be able to restore the consistent versions in the cloud CL.

Second Exemplary Embodiment

As indicated earlier, synchronization conflicts may occur between different versions of a document object shared by at least one computing device cooperating with a cloud. In rare cases, file inconsistencies (file mismatch conflicts) may also occur between the content file and object descriptor file stored as part of an object document by an entity (the computing device DV1 or DV2, or the cloud CL). A secondary exemplary embodiment of the present invention is now described with reference to FIGS. 7-9, notably to address these problems.

The first and second exemplary embodiments share a number of common features to allow efficient synchronization. Among others, the document object DO to be synchronized is structured into at least a content file and an object descriptor file as already described. More specifically, each version the document object DO comprises at least one content file and one object descriptor file (e.g. metadata), wherein the content file comprises a content and the object descriptor file defines the content.

However, in the second exemplary embodiment, the additional feature of a version history is added with respect to the first exemplary embodiment in order to track which previous version(s) of the document object DO contributed to the creation of a given version of said document object. More specifically, for each version of the document object, the object descriptor file comprises (or is associated with) a version history. The version history comprised in a given version of the document object may define or identify at least one previous version (or successive previous versions) of the document object from which originates (i.e. on which is based) said version of the document object. In other words, the version history may define at least one previous version of the document object which contributed to creating said version of the document object. In a particular example, a version history may comprise a list of values or signatures defining a temporal sequence of previous versions of the document object.

Various structure of the document object DO may be encompassed. The version history may be comprised in, or linked to (e.g. as a file wrapper), the object descriptor file within the document object. The version history may for instance comprise at least one signature for authenticating a previous version of the document object. The use of signatures facilitates tracking of the version history of the document object DO in a secure manner. By way of an example, a signature in the version history may be a cryptographic hash (sometimes called "digest"). For instance, SHA-256 allows generating an almost-unique (32-byte) signature that can be associated with a previous version of the document object within the version history. Other types of signatures may be used, however.

In a particular example, the version history comprises at least one timestamp in association with each signature, wherein said timestamp is representative of a modification time of the previous version corresponding to the signature. The use of timestamps may facilitate even further tracking of various previous versions within a version history of the document object DO.

Further, in the secondary exemplary embodiment, it is the content file of a document object which is sent first by a computing device to the cloud and later the associated object descriptor file (instead of the other way round as in the first exemplary embodiment). Particular implementations of the second exemplary embodiment will now be described.

Figure 7:
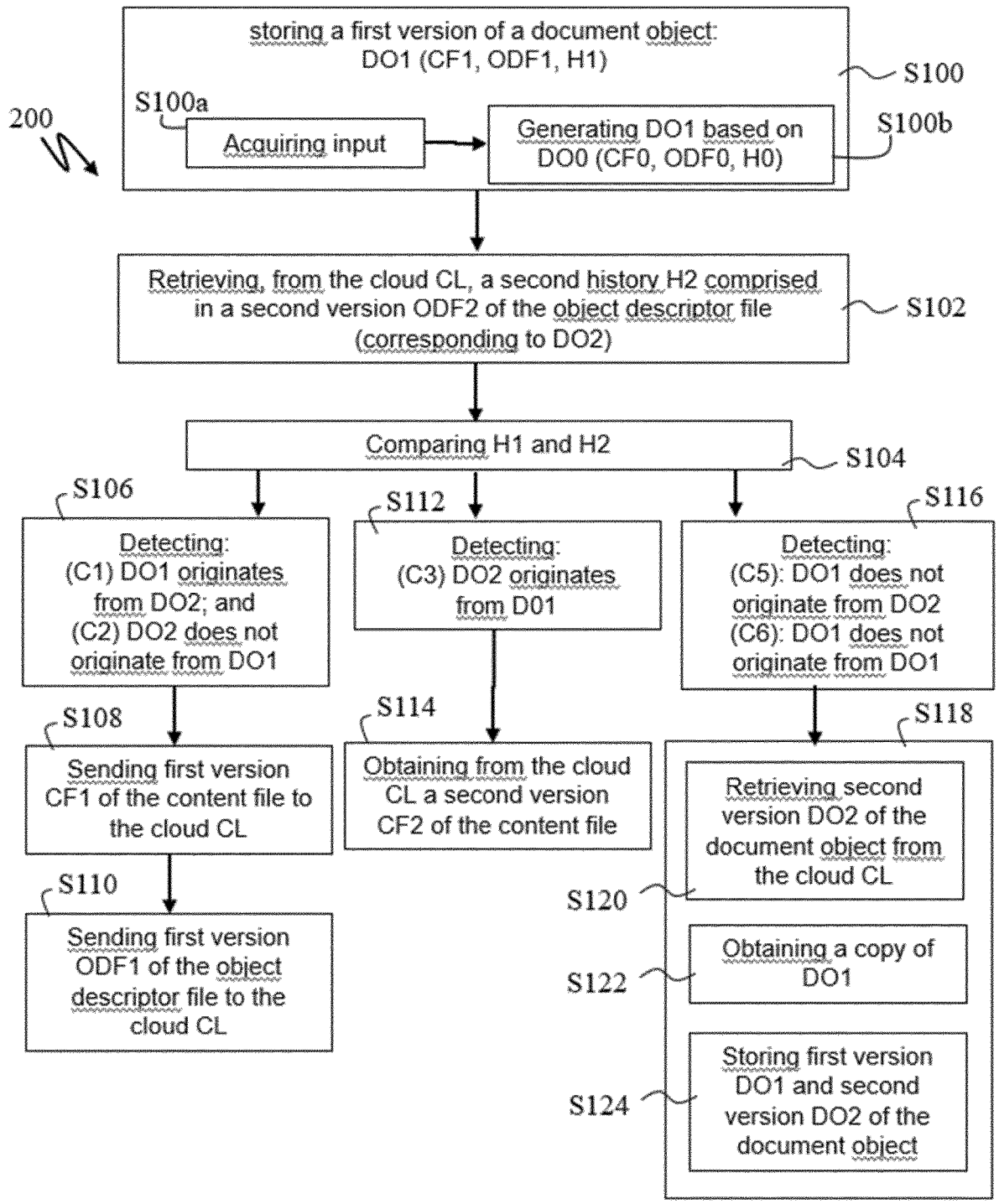
FIG. 7 shows a flow diagram of a method for synchronizing different versions of a document object according to a second exemplary embodiment of the present invention.

FIG. 7 shows a method 200 implemented by the computing device DV1 for synchronizing different versions of a document object DO, that may be stored by at least two devices DV1, DV2 and a cloud CL, according to a second exemplary embodiment of the invention.

A focus is made in FIG. 7 on the method 200 implemented by the first device DV1 (e.g., as previously described with reference to FIGS. 1-2) in cooperation with the cloud CL. The second device DV2 however may operate in the same manner in cooperation with the cloud CL.

In an obtaining step S100, the first device DV1 obtains a first version DO1 of the document object comprising a first version CF1 of the content file in association with a first version ODF1 of the object descriptor file. The first version ODF1 of the object descriptor file comprises a first object descriptor OB1 defining the content. The first version ODF1 of the object descriptor file comprises (or is linked to, or associated with) a first version history H1 which defines at least one previous version of the document object from which originates (on which basis has been created) the first version DO1 of the document object.

For instance, the first version DO1 of the document object is stored by the first device DV1 and may be retrieved from the storage of the first device DV1 in S100.

The first version DO1 of the document object may be obtained (S100) in any appropriate manner. For instance, the first device DV1 acquires (S100a) a first handwriting input for modifying an initial version DO0 of the document object which is initially stored by the first device DV1, said initial version DO0 comprising an initial version CF0 of the content file and an initial version ODF0 of the object description file (including an initial version history H0).

The first device DV1 may then generate (S100b) the first version DO1 of the document object by updating the initial version DO0 of the document object based on the first handwriting input acquired in S100a.

At this stage, it is assumed that the cloud CL stores a second version DO2 of the document object which is different from the first version DO1 of the first device DV1. The second version DO2 stored in the cloud CL comprises a second version CF2 of the content file in association with a second version ODF2 of the object descriptor file. The second version ODF2 of the object descriptor file comprises a second object descriptor OB2 defining the content. The second version ODF2 of the object descriptor file comprises (or is linked to, or associated with) a second version history H2 which defines at least one previous version of the document object from which originates the second version DO2 of the document object.

In a retrieving step S102, the first device DV1 retrieves a second version history H2 comprised in a second version ODF2 of the object descriptor file currently stored as part of a second version ODF2 of the document object in the cloud, said second version history H2 defining at least one previous version of said document object from which originates (on which basis has been created) the second version DO2 of the document object.

In a comparison step S104, the first device DV1 performs a comparison between the first and second version histories H1, H2 to determine whether any of the first and second versions DO1, DO2 of the document object originate from the other. In other words, an analysis of the version histories H1 and H2 is performed and, based on this analysis, it is determined whether DO1 is based on DO2 and/or whether DO2 is based on DO1. To this end, it is for instance determined whether all or part (e.g. a signature) of the version history H1 is contained in H2, and conversely. The comparison of the version histories allows to determine if any of the first version DO1 of the document object has contributed to the generation of the second version DO2, and conversely.

The first device DV1 may then operate based on the result of the comparison S104. As described below, the first device DV1 may check whether conditions are met and operate accordingly to perform synchronization.

As shown in FIG. 7, if it is detected in S106 that the following conditions C1 and C2 are met, the first device DV1 proceeds with steps S108 and S110:
  (C1) the first version DO1 of the document object originates from the second version DO2 of the document object; and
  (C2) the second version DO2 of the document object does not originate from the first version DO1 of the document object.

This case means that the first version DO1 is more recent than the second version DO2. More particularly, when the first condition C1 is met, it means that there are local changes made to the document object that need to be uploaded to the cloud CL. When the second condition C2 is met, it means that the local version OD1 of the document object is an update of the second version OD2 of the cloud CL.

Accordingly, in the sending step S108, the first device DV1 sends the first version CF1 of the content file to the cloud CL, independently of the first version ODF1 of the object descriptor file, to cause the cloud CL to store said first version CF1 of the content file.

By sending (S108) the first version CF1 of the content file to the cloud CL, it is possible to force the cloud CL to synchronize by storing the most up-to-date version of the content file.

In particular example, after sending in S108 the first version CF1 of the content file, the first device DV1 sends (S110) the first version ODF1 of the object descriptor file to the cloud CL for causing said cloud to store said first version ODF1 of the object descriptor file. This forces the cloud CL to store the appropriate version of the object descriptor file which matches the first version CF1 of the content file stored in the cloud CL.

It should be noted that the first version CF1 of the content file is send in S108 to the cloud before sending in S110 the corresponding first version ODF1 of the object descriptor file. This approach of sending the content file first allows an efficient synchronization to be performed. In particular, there is still a risk that a file transfer may fail for various reasons and a file inconsistency may happen if a first file (e.g. the object descriptor file) of a document object is transferred to the cloud but not the other (e.g. the content file). In the present case, if the transfer S110 of the first version ODF1 of the object descriptor file fails, there will be a file inconsistency in the cloud CL but it will be possible to overwrite later the earlier version of the object descriptor file ODF2 maintained at the cloud CL following the failure of the transfer of ODF1, and resolve the file mismatch, for instance in a next synchronization phase. Maintaining an outdated version of a mismatch object descriptor file at the cloud allows another device, at a next synchronization phase, to perform an update of the cloud with a later version of the content file and associated object descriptor file.

In a particular example shown in FIG. 7, if it is detected in S112 that the following condition C3 is met, the first device DV1 proceeds with step S114:
  (C3) the second version DO2 of the document object originates from the first version DO1 of the document object.

This case means that the second version DO2 is more recent than the first version DO1. More particularly, when this condition C3 is met, it means that the second version DO2 contributed to the creation of the first version DO1. In other words, there are changes made to the document object stored in the cloud CL that need to be downloaded to the first device DV1.

Accordingly, in the obtaining step S114, the first device DV1 obtains the second version CF2 of the content file currently stored as part of the second version DO2 of the document object in the cloud CL for storing by the first device DV1.

The first device DV1 can thus store the most-up-to date version of the content file, such that synchronization can be achieved. Based on this second version of the content file, the first device DV1 may possibly also retrieve (or download) from the cloud CL the corresponding second version ODF2 of the object descriptor file.

In a particular example shown in FIG. 7, if it is detected in S116 that the following conditions C5 and C6 are met, the first device DV1 proceeds with a resolution phase S116:
  (C5) the first version DO1 of the document object does not originate from the second version DO2 of the document object; and
  (C6) the second version DO2 of the document object does not originate from the first version DO1 of the document object.

This case means that the first and second versions DO1, DO2 are not correlated to each other. In other words, none of the first and the second versions DO1, DO2 of the document object originates from the other.

Accordingly, in the resolution phase S116, the first device DV1 performs steps S120, S122 and S124. In the retrieving step S120, the first device DV1 retrieves the second version DO2 of the document object currently stored in the cloud CL. In the obtaining step S122, the first device DV1 obtains (or generates) a copy of the first version DO1 of the document object by duplicating said first version DO1, and sends this copy of the first version DO1 to the cloud CL for causing storing of this copy by the cloud CL. In the storing step S124, the first device DV1 stores (or keep in storage) the first and second versions DO1, DO2 of the document object.

The above resolution phase S116 allows to address efficiently a specific synchronization step which may arise with the versions of the document object held respectively by the first device DV1 and the cloud CL are totally unrelated. In particular, it is possible to avoid any data loss. The cloud CL is being provided with a copy of the local version held by the first device DV1 while said first device DV1 keep in memory both versions which may be later handled in any appropriate manner. A user may indeed prefer to keep either the first, or the second version, or both at the same time.

In a particular example, the first device DV1 selects, based on a user-defined instruction, either the first and the second version DO1, DO2 which is maintained in a local memory of the first device DV1, while the other non-elected version (DO1 or DO2 which was not selected) is deleted from the local memory of the first device DV1. The first device DV1 may receive or obtain this user-defined instruction in any appropriate manner. For instance, a prompt may be generated and rendered by the first device DV1 and, in response to said prompt, the first device DV1 may receive the user-defined instructions (by means of the user interface for instance).

As previously indicated, the first and second devices DV1, DV2 of the system SY1 (FIGS. 1-2) may both perform the method 200 (FIG. 3) in the same manner. Accordingly, each device may manage, modify and/or store various versions of the document object DO and achieve synchronization as previously described.

In a particular example, the method 200 comprises (e.g. in the storing step S100 or later) managing the first version history H1 of the first version ODF1 of the object descriptor file by:
identifying at least one intermediate version defined by the first version history H1 as a previous version from which the first version DO1 of the document object originates, said previous version being associated with a timestamp older than a most recent synchronization performed by said first device DV1; and
deleting said least one intermediate version from the first history version.

This way, the memory size occupied by the first history version H1 can be limited by the first device DV1.

In a particular example, the method 200 comprises (e.g. in the storing step S100 or later) managing the first version history H1 of the first version ODF1 of the object descriptor file by performing at least one of the following history management step:
preventing the first version history H1 from defining (containing) more than a threshold number of previous versions of the document object DO by deleting at least one previous version from the first version history H1; and
deleting from the first version history H1 at least one previous version which is associated with a timestamp older than a predefined point in time.

This way, the memory size occupied by the first history version H1 can be limited by the first device DV1.

Figure 8:
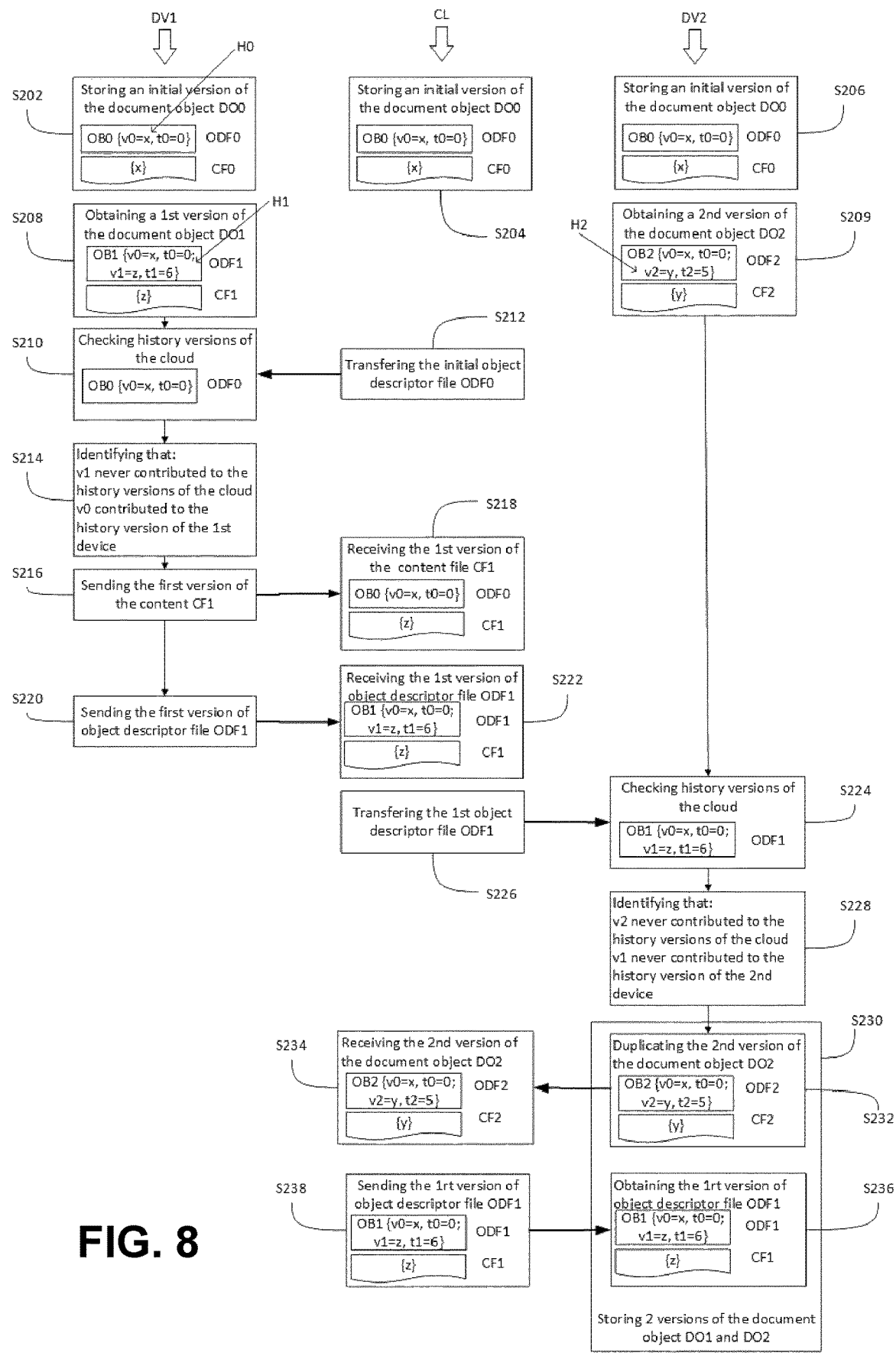
FIG. 8 shows a flow diagram of an example where both the first and second devices DV1, DV2 perform a method in cooperation with the cloud CL for synchronizing different versions of the document object DO in accordance with particular implementations of the method 200 shown in FIG. 6.

FIG. 8 shows an example where both the first and second devices DV1, DV2 perform a method in cooperation with the cloud CL for synchronizing different versions of the document object DO in accordance with particular implementations of the method 200 shown in FIG. 6.

It is first considered that the first and second devices DV1, DV2 and the cloud CL are in an initial state, i.e. at a settled phase, where these two devices and the cloud share or store (S202, S204 and S206, respectively) an initial version (or initial common version) DO0 of the document object DO. In this example, the initial version DO0 of the document object DO comprises an initial version CF0 of the content file CF (e.g. content {x}) and an initial version ODF0 of the object descriptor file ODF (e.g. initial object descriptor OB0 defining an initial value v0=x). The initial version ODF0 of the object descriptor file comprises an object descriptor OB0 which defines an initial version history H0. In this example, this initial version history H0 contains an initial value v0 or an initial signature.

It is noted that for each version of the document object considered in the present example, an object descriptor contained in the object descriptor file may define a timestamp (see t0, t1 and t2), although other embodiments without timestamps are also possible.

In step S208, the first device DV1 obtains a first version DO1 of the document object different from the initial version DO0, e.g. in the same manner as in S100 (FIG. 7). In the present example, this first version DO1 is an updated version of the initial version DO0. In other words, the first version DO1 originates from (is created based on) the initial version DO0.

The first version DO1 of the document object DO comprises a first version CF1 of the content file CF (e.g. content {z}) and a first version ODF1 of the object descriptor file (e.g. object descriptor OB1 defining a first value v1=z). The first version ODF1 of the object descriptor file comprises an object descriptor OB1 which defines a first version history H1. In this example, this first version history H1 contains all or part of the initial version history H0 and a value v1 or a first signature.

In step S210, the first device DV1 retrieves the initial version history H0 comprised in the initial version ODF0 of the object descriptor file currently stored as part of the initial version DO0 of the document object in the cloud CL. To this end, the cloud CL sends (S212) to the first device DV1 the initial version ODF0 of the object descriptor file containing H0.

In parallel, it is assumed that the second device DV2 obtains (S209) a second version DO2 of the document object different from DO0 and DO1, e.g. in the same manner as in S100 (FIG. 7). In the present example, this second version DO2 is an updated version of the initial version DO0. In other words, the second version DO2 originates from (is created based on) the initial version DO0.

The second version DO2 of the document object DO comprises a second version CF2 of the content file CF (e.g. content {y}) and a second version ODF2 of the object descriptor file (e.g. object descriptor OB2 defining a value v2=y). The second version ODF2 of the object descriptor file comprises an object descriptor OB2 which defines a second version history H2. In this example, this second version history H2 contains all or part of the initial version history H0 and a value v2 or a second signature.

Further, the first device DV1 performs (S212) a comparison between the initial version history H0 retrieved from the cloud CL in S210 and the first version history H1 to determine whether any of the versions DO0 and DO1 of the document object originates from the other. For instance, the first device DV1 checks whether the version history H0 is comprised in H1, and conversely.

In the present example, the first device DV1 determines (S216), based on the history analysis in S212, that the initial version DO0 of the document object does not originate from the first version DO1 but that the first version DO1 of the document object does originate from the initial version DO0. In response to this detection S216, the first device DV1 sends the first version CF1 of the content file to the cloud CL, independently of the first version of the object descriptor file ODF1, to cause the cloud to store said first version CF1 of the content file.

The cloud CL receives and stores in S218 the first version CF1 next to the initial version ODF0 of the object descriptor file. At this particular instant, there is a transient file inconsistency between ODF0 and CF1 which correspond to different versions of the document object DO which is solved hereafter.

After sending in S216 the first version CF1 of the content file, the first device DV1 sends to the cloud the first version ODF1 of the object descriptor file for storing by the cloud CL.

The cloud receives and stores in S222 the first version ODF1 of the object descriptor file ODF1 next to the first version CF1 of the content file. As mentioned above, the file inconsistency is thus transient. The present example may then carry on with the second device DV1 performing the steps described below.

The second device DV2 retrieves (S224) the first version history H1 comprised in the first version ODF1 of the object descriptor file currently stored as part of the first version DO1 of the document object in the cloud CL. To this end, the cloud CL sends (S226) to the second device DV2 the first version ODF1 of the object descriptor file containing H1.

Further, the second device DV2 performs (S228) a comparison between the first version history H1 retrieved from the cloud CL in S224 and the second version history H2 to determine whether any of the versions DO1 and DO2 of the document object originates from the other. For instance, the second device DV2 checks whether the version history H1 is comprised in H2, and conversely.

In the present example, the second device DV2 determines (S228), based on the history analysis in S224, that none of the first and second signatures v1, v2 of the document object originates from the other.

In response to the determination S228, the second device DV2 performs a resolution phase S230 comprising steps S232 and S236. More specifically, the second device DV2 generates (S232) a copy of the second version DO2 of the document object by duplicating said second version DO2.

Still as part of the resolution phase S230, the second device DV2 retrieves (S236) the first version DO1 of the document object currently stored in the cloud CL and stores simultaneously (maintains in its local memory) the first and second versions DO1, DO2. The second device sends (S232) a copy of the second version of the document object to the cloud CL for storing by the cloud CL, the cloud CL receives and stores in S234 the second version DO2 of the document object.

As already indicated, the presence of two co-existent versions DO1, DO2 of the document object locally at the level of the second device DV2 can be handled in various manners. For instance, a user may be asked to select one version to keep while the other is deleted. In case of persistent inconsistency, further exemplary embodiments allow to correct a possible persistent inconsistency, as explained below.

It has been observed that in most cases, efficient synchronization without data loss can be achieved over the system. In particular, synchronization conflicts can be solved. However, in some rare cases, it has been observed that even by implementing the second exemplary embodiment of the present invention, some file inconsistency may persist leading to file mismatch conflict.

Figure 9:
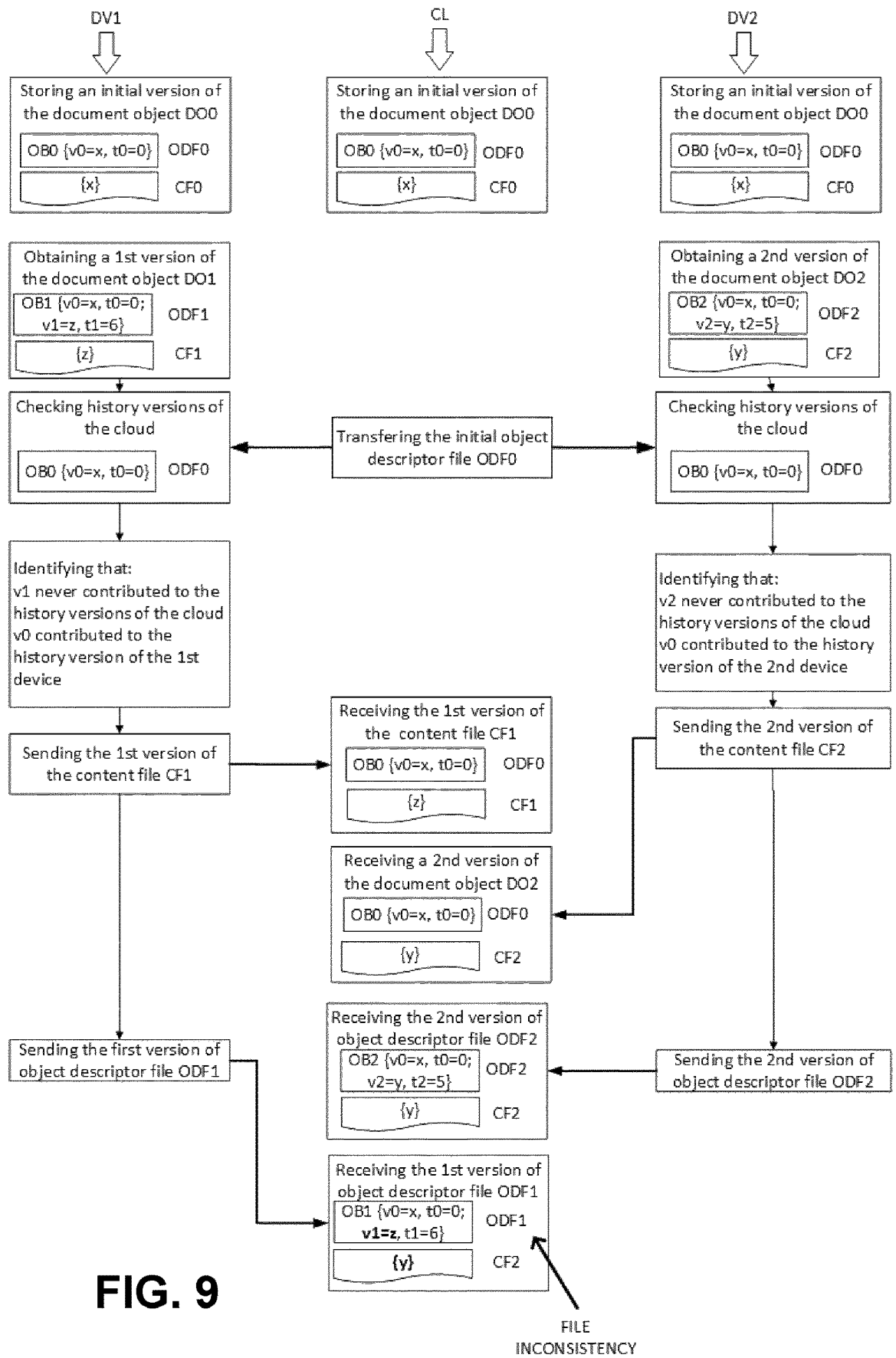
FIG. 9 shows a schematic view of a rare persistent file inconsistency occurring while the first device DV1 and the second device DV2 perform the method 200 in cooperation with the cloud CL in accordance with the second exemplary embodiment.

For illustrative purpose, FIG. 9 depicts a rare persistent file inconsistency occurring while the first device DV1 and the second device DV2 perform the method 200 in cooperation with the cloud CL in accordance with the second exemplary embodiment. A different outcome of the synchronization is reached (relative to the examples of FIGS. 7-8) because there is an overlap over time of the synchronization phases performed respectively by the first and second devices DV1, DV2 and leading to a file mismatch conflict.

More specifically, as can be seen in FIG. 9, the first and second devices DV1, DV2 retrieves the initial version history H0 from the cloud CL in a relatively short time period. As a result, the two devices trigger at more or less the same time the sending to the cloud of their respective versions of the content file and object descriptor file. In the present example, the first device DV1 sends its first version CF1 of the content file to the cloud CL prior to the second device DV2 sending its second version CF2 of the content file to the cloud CL.

As this stage, the cloud CL thus stores the second version CF2 of the content file in association with the initial version ODF0 of the object descriptor file. Typically, it is not known from the first device's prospective that the cloud CL has overwritten the first version CF1 of the content file received from the first device DV1 with the second version CF2 later received from the first device DV1. This rare case may lead to a persistent file inconsistency or file mismatch conflict.

For example, as shown in FIG. 9, the second device DV2 may later send its second version ODF2 Of the object descriptor file to the cloud before the sending by the first device DV1 to the cloud CL of its first version ODF1 of the object descriptor file. As a result, the cloud CL overwrites the second version ODF2 of the object descriptor file received from the second device DV2 with the first version ODF1 later received from the first device DV1, thereby generating a file inconsistency in the cloud CL referred to as file mismatch conflict.

Third Exemplary Embodiment

As indicated above, in some rare occasions file inconsistencies (file mismatch conflicts) may persist even if the computing devices DV1, DV2 of the system SY1 implement the method 200 for synchronization in accordance with the second exemplary embodiment. A third exemplary embodiment of the present invention is now described with reference to FIGS. 10-12 notably to address the problem of file mismatch conflicts.

In the third exemplary embodiment, the first and second computing devices DV1, DV2 mainly operate according to the method 200 of the second exemplary embodiment described above. However, the first and second devices DV1, DV2 implement an additional feature in cooperation with the cloud for improving the synchronization process, i.e. they use a unique identifier associated with either the content file or the object descriptor file to detect if a file mismatch conflict occurs. As previously described, it is not always feasible for a computing device to detect a file mismatch conflict in the cloud CL. Such conflicts may however be detected and thus resolved by a computing device by using the additional feature of the unique identifier.

As will be described below, different implementations of the third exemplary embodiment are possible. In particular, a unique identifier CID may be used in association with either the content file or the object descriptor file of the document object DO.

Figure 10:
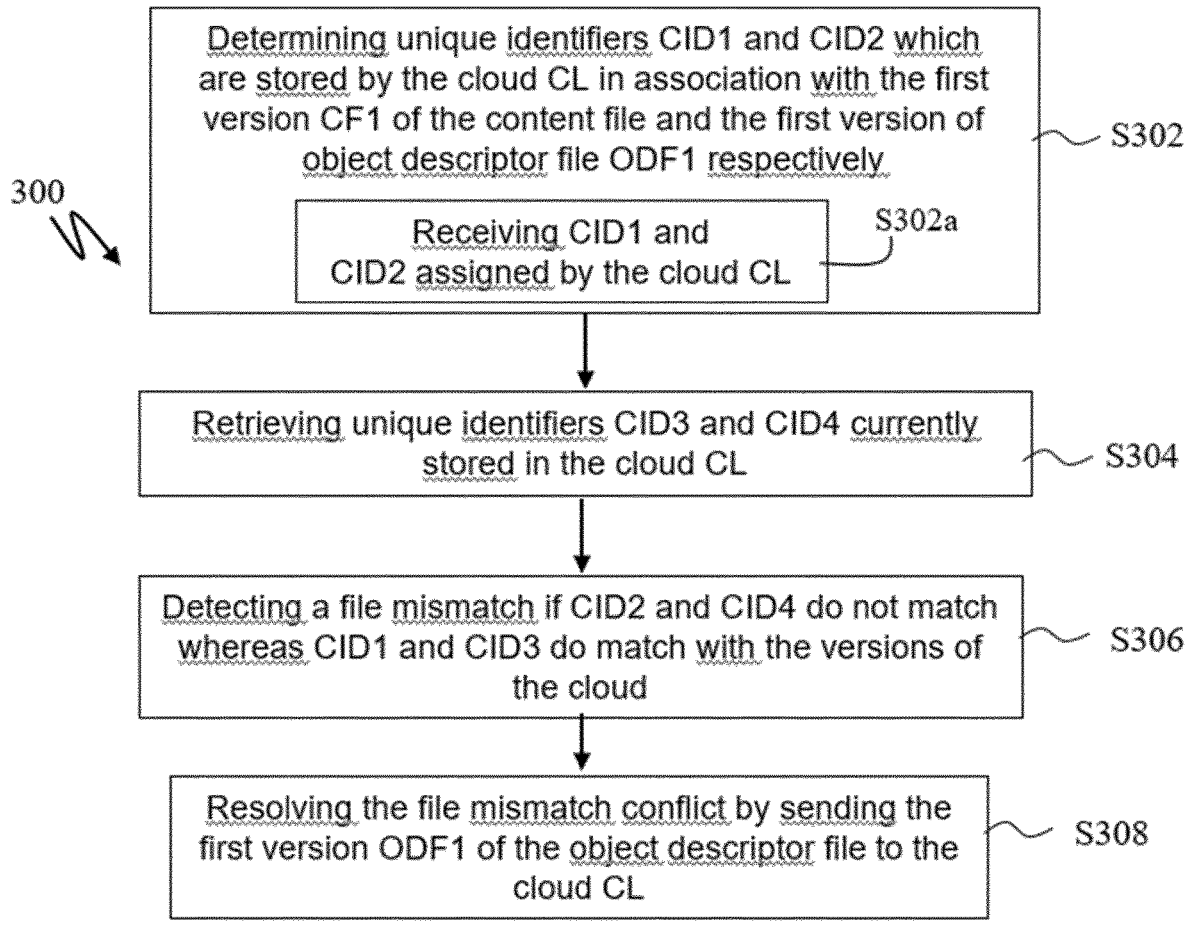
FIG. 10 shows a flow diagram of a method (noted 300) for synchronizing different versions of a document object DO in accordance with the third exemplary embodiment.

FIG. 10 shows an implementation of a method (noted 300) for synchronizing different versions of a document object DO in accordance with the third exemplary embodiment. In FIG. 10, a focus is made on the method 300, which is performed by the computing device DV1 in cooperation with the cloud CL (e.g. as previously described in FIGS. 1-2). The second device DV2 however may operate in the same manner in cooperation with the cloud CL.

In the example of FIG. 10, it is assumed that the first device DV1 performs the method 200 as previously described (FIG. 7) and further performs the steps of the method 300. In other words, the method 300 is implemented in addition to the steps of the method 200 as previously described. Accordingly, all the steps and features of the method 200 will not be repeated for the sake of conciseness.

More specifically, in the first example of FIG. 10, the first device DV1 determines (S302) a first unique identifier CID1 which is stored by the cloud CL in association with the first version CF1 of the content file sent in S108 (FIG. 7), and a second unique identifier CID2 which is stored by the cloud CL in association with the first version ODF1 of the object descriptor file sent in S110.

In a first variant, the cloud CL assigns the unique identifier CID1. In this case, the first device DV1 receives (S302a), in response to the sending S108 (FIG. 7) of CF1 to the cloud CL, the unique identifier CID1 assigned by the cloud CL in association with the first version CF1 of the content file. More specifically, the cloud CL receives CF1 sent in S108 by the first device DV1, generates or selects the first unique identifier CID1, stores CF1 in association with the first unique identifier CID1, and transmits CID1 back to the first device DV1 in response to S108. The cloud CL may for instance send back to the first device DV1 the assigned unique identifier CID1 as an acknowledgement of the transmission S108 of CF1 by the first device DV1. In a particular example, the cloud CL assigns and sends back this unique identifier CID1 to the first device DV1 once the upload S108 of CF1 from the first device DV1 to the cloud CL is completed.

In a second variant, the cloud CL stores values of the unique identifiers CID1 and CID2 respectively associated with the first version CF1 of the content file and the first version of the object descriptor file ODF1 and respectively sent together with the content file and the object descriptor file data transfer. In an example implementation of this second variant, the unique identifiers CID1 and CID2 are respectively the signatures of the first version CF1 of the content file, for example a SHA-256 hash of the content file, and the first version ODF1 of the object descriptor file, for example a SHA-256 hash of the object descriptor file. Therefore, the first device DV1 selects or generates the first unique identifier CID1 and then sends in S108 the first unique identifier CID1 along with the first version CF1 of the content file to the cloud CL to cause the cloud to store the first unique identifier CID1 in association with the first version CF1 of the content file. The first device DV1 thus determines in S302 the first unique identifier CID1 since, in the case it is the first device DV1 which assigns the unique identifier CID1 (first variant), a problem may arise in exceptional circumstances if two different devices (e.g. DV1 and DV2) cooperating with the cloud CL send different unique identifiers to the cloud CL in association with different versions of the content file. As will be seen below, this would undermine the process of file inconsistency resolution based on unique identifiers.

As shown in FIG. 10, the first device DV1 may store in S302 the unique identifier CID1 for later checking.

The first device DV1 may later check whether a file mismatch conflict has occurred in the cloud. To this end, in a retrieving step S304, the first device DV1 retrieves unique identifiers CID2 associated with the object descriptor file and CID4 in association with a version of the content file, which are currently stored in the cloud CL. It is noted that the cloud CL may have received in the meantime another version of the content file which is now stored by the cloud CL in association with a different unique identifier. The cloud CL is configured to store a new unique identifier in association with the content file each time a new version of said content file is received from a computing device. The first device DV1 may for instance request the latest unique identifier CID stored by the cloud CL in association with the content file. The unique identifier CID3 and CID4 retrieved in S304 may thus be either the unique identifiers CID1 and CID2 (if no change to the files have been made in the cloud CL since the upload S108 and S110) or different from the unique identifier CID1 and CID2 (if a new couple [content file; CID] has been stored by the cloud CL since the upload S108 and S110).

In a detecting step S306, the first device DV1 detects a file mismatch conflict if one of the unique identifiers CID3 or CID4 retrieved in S304 from the cloud CL does not match the unique identifiers CID1 or CID2 determined in S302, whereas the other one does match.

In one embodiment, in a resolving step S308, the first device DV1 resolves the file mismatch conflict detected in S306 by sending once again the first version ODF1 of the object descriptor file for causing the cloud CL to store again the first version ODF1 of the object descriptor file.

In another embodiment, in a resolving step S308a, the first device DV1 resolves the file mismatch conflict detected in S306 by sending once again the first version CF1 of the content file for causing the cloud CL to store again the first version CF1 of the content file. It should be noted however that sending back in S308 the object descriptor file ODF1 to the cloud CL is more advantageous since it requires fewer processing resources in term of bandwidth to transfer a smaller size file. The use of the unique identifiers thus allows the first device DV1 to detect occurrence of a file mismatch conflict in the cloud CL (e.g., as a result of an upload from another computing device) and to force said cloud to store the appropriate version of the object descriptor file, thereby improving even further the synchronization process.

Figure 11:
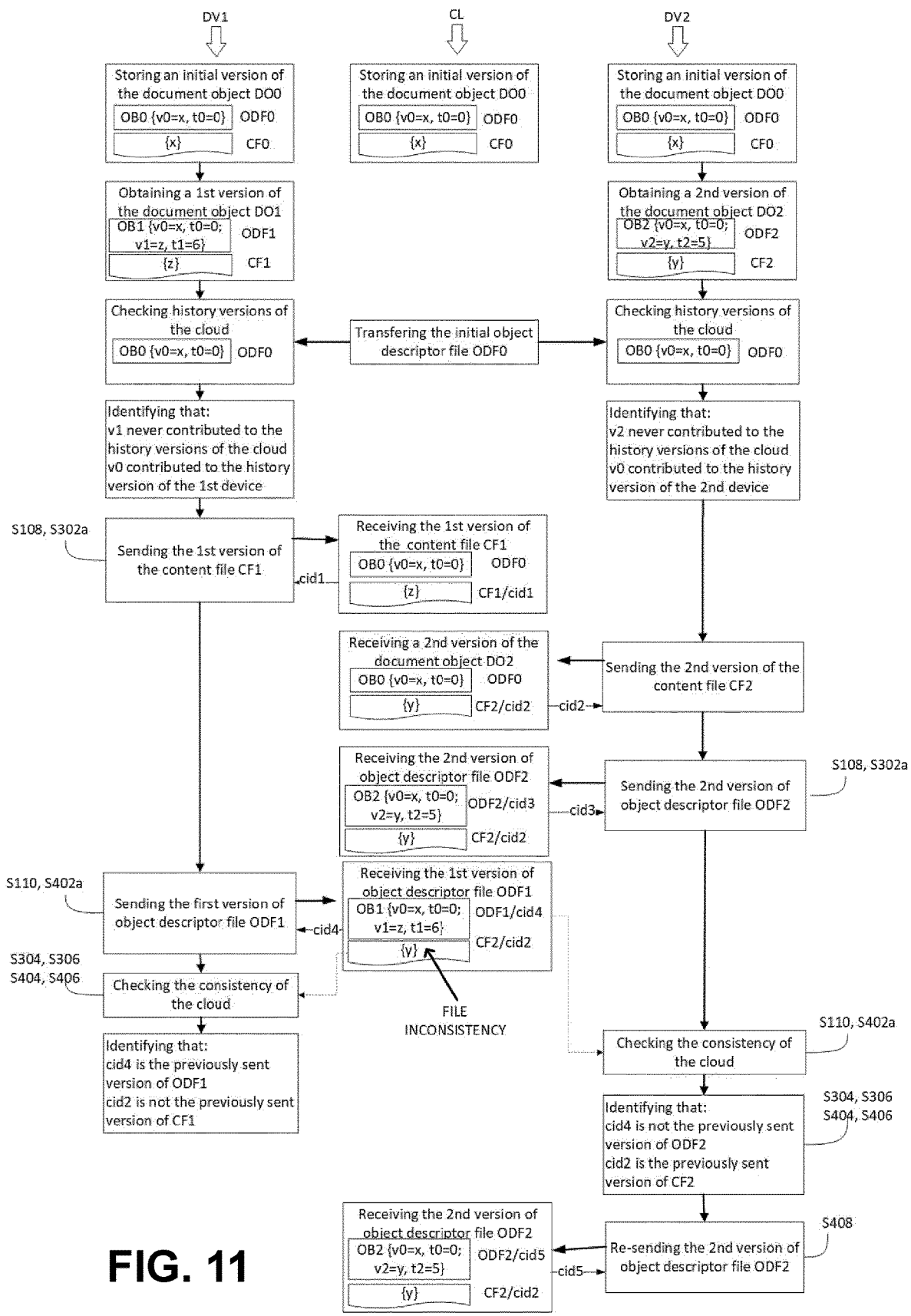
FIG. 11 shows a schematic view of an example where both the first and second devices DV1, DV2 perform a method in cooperation with the cloud CL for synchronizing different versions of the document object DO in accordance with particular implementations of the method 200 shown in FIG. 6.

FIG. 11 shows an example where both the first and second devices DV1, DV2 perform a method in cooperation with the cloud CL for synchronizing different versions of the document object DO in accordance with particular implementations of the method 200 shown in FIG. 6. As can be seen, the first and second devices DV1, DV2 try both to upload to the cloud CL new versions of the content file and object descriptor file, thereby causing a file inconsistency in the cloud CL. The cloud CL assigns unique identifiers CD1 and CD4 to respectively the first version CF1 of the content file and the first version ODF1 of the object descriptor file. Likewise, the cloud CL assigns unique identifiers CD2 and CD3 to respectively the second version CF2 of the content file and the second version ODF2 of the object descriptor file. By checking the unique identifiers stored by the cloud in association with respectively the content file and the object descriptor file, each computing device DV1, DV2 can detect the file inconsistency. The use of the unique identifier CID3 associated with the object descriptor file ODF2 thus allows the second device DV2 to detect occurrence of a file mismatch conflict in the cloud CL (e.g., as a result of an upload from the first computing device DV1) and to force said cloud to store an appropriate version of the object descriptor file ODF2. A gain in resources (processing, transmission) can be achieved by sending again the object descriptor file ODF2 in S408 of the second variant (instead of sending again the content file in S308 of the first variant).

Fourth Exemplary Embodiment

As indicated above, in some rare occasions file inconsistencies (file mismatch conflicts) may persist even if the computing devices DV1, DV2 of the system SY1 implement the method 200 for synchronization in accordance with the second exemplary embodiment is implemented. A fourth exemplary embodiment of the present invention is now described with reference to FIGS. 12-13 notably to address the problem of file mismatch conflicts.

In the fourth exemplary embodiment, the first and second computing devices DV1, DV2 mainly operate according to the method 200 of the second exemplary embodiment described above. However, the first and second devices DV1, DV2 implement a subsequent resolution phase for improving the synchronization process, i.e. they recalculate a signature associated with the content file of the cloud to detect if a file mismatch conflict occurs.

As previously described, it is not always feasible for the first computing device to detect the generation of a file mismatch conflict in the cloud CL. Such conflicts may however be detected at a later stage by a second device and thus resolved by the second computing device by using the subsequent resolution phase.

As will be described below, different implementations of the fourth exemplary embodiment are possible.

Figure 12:
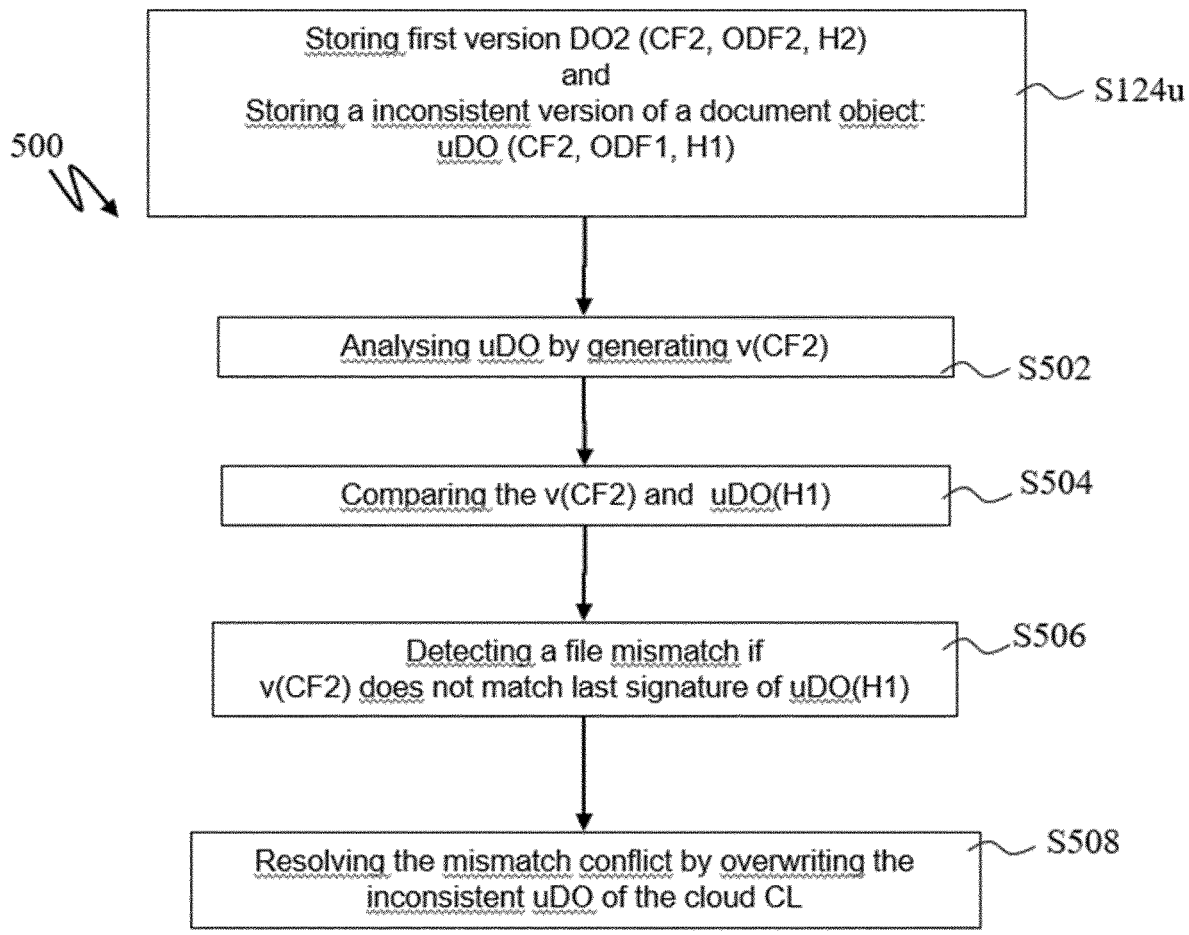
FIG. 12 shows a flow diagram of a method (noted 500) for synchronizing different versions of a document object DO in accordance with the fourth exemplary embodiment.

FIG. 12 shows one implementation of a method (noted 500) for resolving a file mismatch conflict of a document object DO in accordance with the fourth exemplary embodiment. In FIG. 12, a focus is made on the method 500 which is performed by the computing device DV2 in cooperation with the cloud CL (e.g. as previously described in FIGS. 1-2). The first device DV1 however may operate in the same manner in cooperation with the cloud CL.

Figure 13:
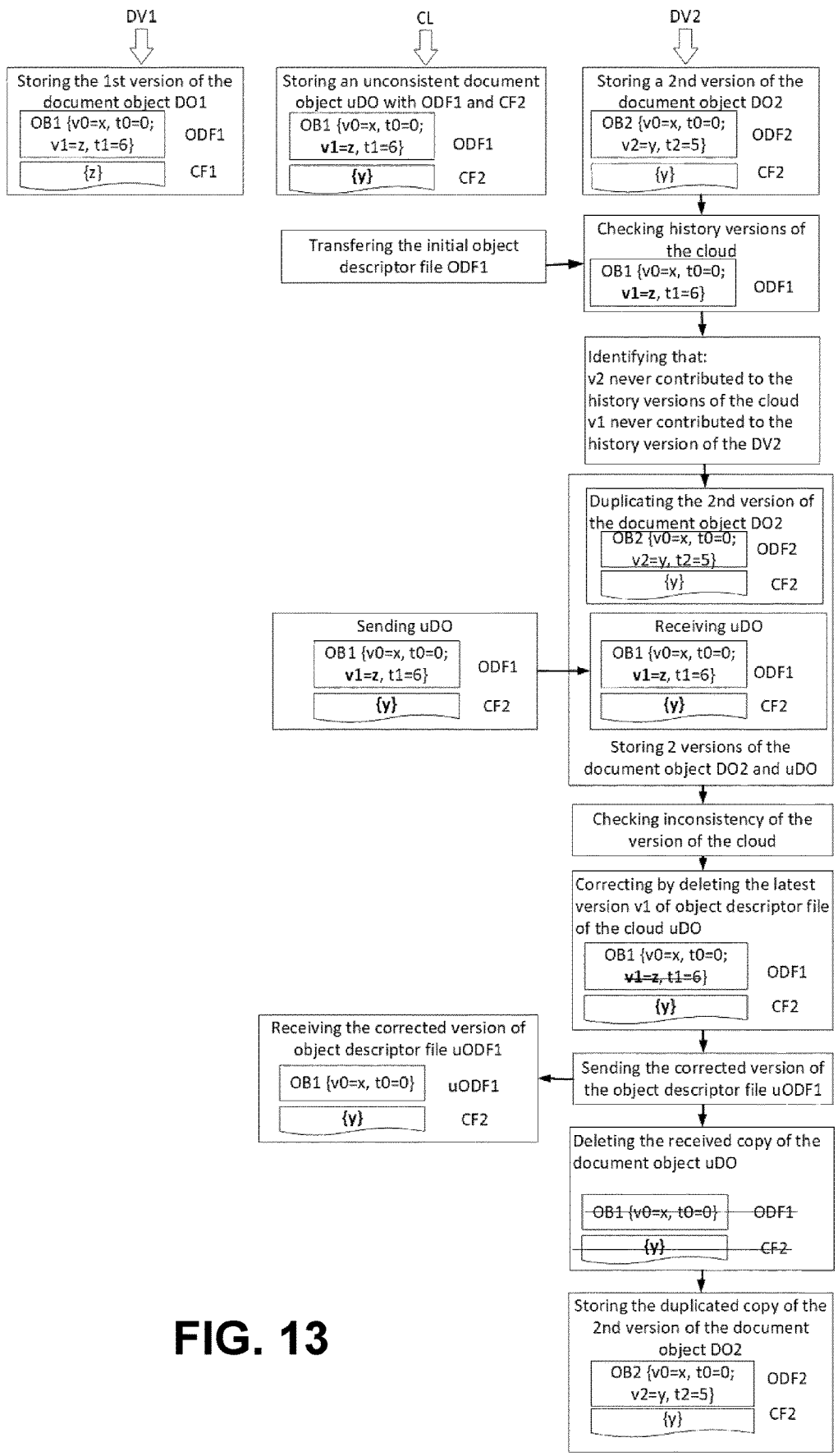
FIG. 13 shows a schematic view of an example of one implementation of the method of FIG. 12 (noted 500) for resolving a file mismatch conflict of a document object DO in accordance with the fourth exemplary embodiment.

As preliminary steps (not shown) of the example illustrated in the FIG. 13, both the first and second devices DV1, DV2 perform the method in cooperation with the cloud CL for synchronizing different versions of the document object DO in accordance with particular implementations of the method 200. In the present example and as illustrated in the FIG. 9, a rare persistent file inconsistency occurring while the first device DV1 and the second device DV2 perform the method 200 in cooperation with the cloud CL in accordance with the second exemplary embodiment. An overlap over time of the synchronization phases performed respectively by the first and second devices DV1, DV2 is leading to a file mismatch conflict, wherein an inconsistent document object uDO, composed of the first version of the object descriptor file ODF1 associated with the second version of the content file CF2, is stored at the cloud.

In the example of FIG. 12, it is assumed that the second device DV2 further performs a synchronization cycle in accordance with the steps of the method 200 for synchronizing the version DO2 of the document object. Because of the mismatch conflict occurring at the previous synchronization cycle, the second version of the document object DO2 was not synchronized, and the inconsistent version of the document object uDO is stored at the cloud.

According to the fourth embodiment, the second device DV2 implements a subsequent resolution phase for improving the synchronization process. In other words, the method 500 is implemented by the second device in addition to the steps of the method 200 as previously described. Accordingly, all the steps and features of the method 200, including steps S100 to S124, will not be repeated for the sake of conciseness. The last step of method 200 is represented on FIG. 12 as an unusual step S124u, wherein the device DV2 is storing two versions of the document object including DO2 and uDO.

More specifically, in the FIG. 12, the second device DV2 implements the method 500 as subsequent steps of the method 200 wherein the outcome of the method 200 results in the unusual step S124u. Further, in an analyzing step S502, the second device generates a signature v(CF1) of the first content file CF1 of the inconsistent document object uDO obtained from the cloud. Then, in a comparing step S504, the second device DV2 performs a comparison between the generated signature v(CF2) of the inconsistent document object uDO and the last signature of the history H1 of the object descriptor file ODF1 of the inconsistent document object uDO. Therefore, in a detecting step S506, the second device detects a file mismatch if the generated signature v(CF2) of the inconsistent document object uDO does not match the last signature of the history version H1 of the object descriptor file ODF1 of the inconsistent document object uDO.

As shown in FIG. 12, if it is detected in S506 that the versions of the object descriptor file and the content file obtained from the cloud do not match, the second device initiates the resolution of the mismatch conflict by setting the cloud in a state that will let another device detect and fix the mismatch proceed with the resolution of the mismatch conflict S508 by overwriting the inconsistent document object at the cloud with an outdated history version of the document object, wherein the outdated history version is a history including older signature versions.

The overwriting of the inconsistent document object may be performed according to different examples as described below.

As a first example, the second device may modify the history version H1 of the object descriptor file of the inconsistent document object by deleting the last signature v1 of the history of the first object descriptor file. As a subsequent step, the second device resolves the mismatch conflict by sending a modified inconsistent document object, including the second version of the content file and the modified version of the object descriptor file, to the cloud CL.

As a second example, the second device may modify the inconsistent document object by deleting the first version of the object descriptor file ODF1 of the inconsistent document object.

As a subsequent step, the second device resolves the mismatch conflict by sending the modified inconsistent document object to the cloud CL, therefore including the second version of the content file only.

As a third example, the second device resolves the mismatch conflict by deleting the inconsistent document object, including the second version of the content file and the first version of the object descriptor file, at the cloud.

This approach of modifying or deleting the inconsistent object descriptor file at the cloud allows the system to resolve a file mismatch conflict at a later synchronization cycle in accordance with particular implementations of the method 200. The later synchronization cycle shall be performed by another device, e.g the first device, in cooperation with the cloud CL for synchronizing different versions of the document object DO. By maintaining an outdated version of a mismatch object descriptor file at the cloud, another device, e.g. the first device, at a next synchronization phase, performs an update of the cloud with a later version of the document object including consistent content file and object descriptor file.

FIG. 13 shows an example where the second device DV2 performs a method in cooperation with the cloud CL for synchronizing different versions of the document object DO in accordance with particular implementations of the method 200 shown in FIG. 6 and of the method 500 shown in FIG. 13.

It is first considered that the devices DV1, DV2 and the cloud CL are in a settled phase, where these two devices and the cloud store different versions DO1, uDO and DO2 respectively of the document object DO.

In the present example, the first and the second versions DO1 and DO2 are updated versions of the initial version DO0, wherein the first and second versions DO1 and DO2 were maintained at the first and the second device respectively during the file mismatch conflict occurring at the cloud during a previous synchronization cycle as illustrated in the FIG. 9.

The first version ODF1 of the object descriptor file comprises an object descriptor OB1 which defines a first version history H1. In this example, this first version history H1 contains the value v1 of the first signature.

The second version ODF2 of the object descriptor file comprises an object descriptor OB2 which defines a second version history H2. In this example, this second version history H2 contains the value v2 of the second signature.

In this example, the inconsistent version uDO of the document object DO, at the cloud, comprises the second version CF2 of the content file CF (e.g. content {y}) and the first version ODF1 of the object descriptor file ODF (e.g. first object descriptor OB1 defining a first value v1=z).

The second device DV2 retrieves the first version history H1 comprised in the first version ODF1 of the object descriptor file currently stored as part of the inconsistent document uDO of the document object in the cloud CL. To this end, the cloud CL sends to the second device DV2 the first version ODF1 of the object descriptor file containing H1.

Further, the second device DV2 performs a comparison between the first version history H1 retrieved from the cloud CL and the second version history H2 to determine whether any of the versions uDO and DO2 of the document object originates from the other. For instance, the second device DV2 checks whether the version history H1 is comprised in H2, and conversely.

In the present example, the second device DV2 determines, based on the history analysis, that none of the first and second signatures v1, v2 of the document object originates from the other.

In response to the determination, the second device DV2 performs a resolution phase as follows. More specifically, the second device DV2 obtains a copy of the second version DO2 of the document object by duplicating said second version DO2.

Still as part of the resolution phase, the second device DV2 retrieves the inconsistent version uDO of the document object currently stored in the cloud CL and stores simultaneously (maintains in its local memory) the versions DO2 and uDO. To this end, the cloud CL sends the inconsistent version uDO of the document object to the second device DV2.

As already indicated, the presence of two co-existent versions DO2, uDO of the document object locally at the level of the second device DV2 can be handled in various manners.

In the examples of FIGS. 13, it is assumed that the second device DV2 further performs the method 500 as previously described (FIG. 13).

The second device DV2 implements a subsequent resolution phase by checking the consistency of the document object version of the cloud.

In an analyzing step S502, the second device generates a signature v(CF2) of the second content file CF2 of the inconsistent document object uDO obtained from the cloud.

Then, in a comparing step S504, the second device DV2 performs a comparison between the generated signature v(CF2) of the inconsistent document object uDO and the last signature of the history H1 of the object descriptor file ODF1 of the inconsistent document object uDO.

Further, in a detecting step S506, the second device detects a file mismatch between the generated signature v(CF2) of the inconsistent document object uDO and the last signature of the history version H1 of the object descriptor file ODF2 of the inconsistent document object uDO.

Therefore, the second device proceeds with the resolution of the mismatch conflict S508 by overwriting the inconsistent document object uDO at the cloud with a modified version of the document object mDO. In the example of FIG. 13, the modified document object results from the deletion of the last signature v1 of the history version H1 of the object descriptor file of the inconsistent document object by in the second device. As a subsequent step, the second device resolves the mismatch conflict by sending the modified document object mDO to the cloud CL and overwrite the inconsistent document uDO at the cloud. The modified document object mDO at the cloud includes an outdated history version of the object descriptor file.

Therefore, a following synchronization of the first device will synchronize the cloud with consistent document object and resolve the file mismatch conflict.

In addition to the sending of the modified document object to the cloud, the second device deletes the modified document object locally and maintains one second version of the document object DO2 including the second version of the content file and the second version of the object descriptor file.

The terminology used herein is for the purpose of describing particular exemplary embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present application. No ordering is implied between a first element and a second element.

Reference numerals appearing in the claims are by way of illustration only and shall have no limiting effect on the scope of the claims. Although not explicitly described, the present exemplary embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

A number of implementations have been described. Nevertheless, it will be understood that various modifications may be made. For example, elements of different implementations may be combined, supplemented, modified, or removed to produce other implementations.

Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, implemented by a first device (DV1), for managing different versions of a document object (DO1, DO2) in cooperation with a cloud (CL), wherein each version of said document object comprises at least one content file and one object descriptor file, said content file comprising a content and said object descriptor file comprising at least one object descriptor defining said content, wherein said object descriptor file comprises a version history, said method comprising:
storing (S10) a first version of the document object comprising a first version (CF1) of the content file and a first version (ODF1) of the object descriptor file, said first version of the object descriptor file comprising a first version history (H1) defining at least one previous version of said document object on which basis the first version of the document object has been created;
retrieving a second version history (H2) comprised in a second version (ODF2) of the object descriptor file currently stored as part of a second version of the document object in the cloud, said second version history defining at least one previous version of said document object on which basis the second version of the document object has been created;
performing a comparison of the first and second version histories (H1, H2) to determine whether any of the first and second versions (DO1, DO2) of the document object originates from the other;
if it is detected, based on the comparison of the first and second version histories (H1, H2), that the first version (DO1) of the document object originates from the second version (DO2) of the document object while the second version (DO2) of the document object does not originate from the first version (DO1) of the document object, sending the first version (CF1) of the content file to the cloud, independently of the first version of the object descriptor file, to cause the cloud to store said first version of the content file;
determining a first unique identifier (CID1) which is stored by the cloud (CL) in association with the first version (CF1) of the content file;
retrieving a unique identifier (CID2) currently stored in the cloud (CL) in association with a version of the content file;
detecting a file mismatch conflict if the retrieved unique identifier (CID2) does not match the first unique identifier (CID1); and
resolving the file mismatch conflict by sending the first version (CF1) of the content file for causing said cloud (CL) to re-store said first version of the content file.

2. The method according to claim 1, further comprising: sending the first version (ODF1) of the object descriptor file to the cloud for causing said cloud to store said first version of the object descriptor file.

3. The method according to claim 1, further comprising:
if it is detected, based on the comparison of the first and second version histories (H1, H2), that the second version (DO2) of the document object originates from the first version (DO1) of the document object, obtaining a second version (CF2) of the content file currently stored as part of the second version of the document object in the cloud for storing by the first device.

4. The method according to claim 1, further comprising:
if it is detected, based on the comparison of the first and second version histories (H1, H2), that none of the first and the second versions of the document object originates from the other, performing a resolution phase comprising:
retrieving the second version (DO2) of the document object currently stored in the cloud;
obtaining a copy of the first version of the document object (DO1) by duplicating said first version of the document object and sending said copy to the cloud for causing storing of said copy by the cloud; and
storing simultaneously the first and second versions (DO1, DO2) of the document object.

5. The method according to claim 4, further comprising:
selecting, based on a user-defined instruction obtained by the first device, one of the first and second versions which is maintained in a local memory of the first device while the other non-elected version is deleted from said local memory.

6. The method according to claim 1, wherein the version histories of the first and second versions of the document object comprise at least one signature for authenticating a previous version of the document object.

7. The method according to claim 6, wherein the version histories of the first and second versions of the document object comprise, in association with said at least one signature, at least one timestamp representative of a modification time of said previous version.

8. The method according to claim 1, wherein said storing a first version of the document object comprising a first version (CF1) of the content file and a first version (ODF1) of the object descriptor file comprises:
  acquiring a first handwriting input for modifying an initial version (DOO) of the document object initially stored by the first device, said initial version of the document object comprising an initial version of the content file and an initial version of the object description file; and
  generating the first version (DO1) of the document object by updating the initial version of the document object based on the first handwriting input.

9. A method, implemented by a system (SY1) comprising a first device and a second device (DV1, DV2), for synchronizing different versions (DO1, DO2) of a document object in cooperation with a cloud (CL), wherein each version of said document object comprises at least one content file and one object descriptor file, said content file comprising a content and said object descriptor file comprising at least one object descriptor defining said content,
  wherein said object descriptor file comprises a version history,
  wherein the first and second devices (DV1, DV2) synchronize the different versions (DO1, DO2) of the document object by cooperating respectively with the cloud in accordance with the method of claim 1.

10. A computer program comprising instructions which, when executed by one or more processors, causes the one or more processors to carry out a method claimed in claim 1.

11. A non-transitory storage medium carrying instructions of program code for executing the method claimed in claim 1.

12. The method of claim 1, wherein the sending comprises sending the first unique identifier (CID1) along with the first version (CF1) of the content file to the cloud to cause the cloud to store the first unique identifier in association with the first version of the content file.

13. The method of claim 1, wherein said determining is performed by receiving, in response to the sending the first version (CF1) of the content file to the cloud, the first unique identifier (CID1) assigned by the cloud in association with the first version (CF1) of the content file.

14. The method of claim 1, further comprising:
  determining a first unique identifier (CID1) which is stored by the cloud in association with the first version (ODF1) of the object descriptor file;
  retrieving a unique identifier (CID2) currently stored in the cloud (CL) in association with a version of the object descriptor file;
  detecting a file mismatch conflict if the unique identifier (CID2) retrieved does not match the first unique identifier (CID1); and
  resolving the file mismatch conflict by sending the first version (ODF1) of the object descriptor file version for causing said cloud to re-store said first version of the object descriptor file.

15. The method of claim 14, wherein the sending of the first version (ODF1) of the object descriptor file comprises sending the first unique identifier (CID1) along with the first version (ODF1) of the object descriptor file to the cloud to cause the cloud to store the first unique identifier in association with the first version of the object descriptor file.

16. The method of claim 14, wherein said determining the first unique identifier (CID1) is performed by receiving, in response to the sending, the first identifier (CID1) assigned by the cloud in association with the first version (CF1) of the content file.

17. A device (DV1, DV2) configured to cooperate with a cloud (CL), for synchronizing different versions (DO1, DO2) of a document object, wherein each version of said document object comprises at least one content file and one object descriptor file, said content file comprising a content and said object descriptor file comprising at least one object descriptor defining said content, wherein said object descriptor file comprises a version history, said device comprising modules for performing the method of claim 1.

18. A system (SY1) comprising first and second devices (DV1, DV2) configured to cooperate with a cloud (CL), for synchronizing different versions (DO1, DO2) of a document object, wherein each version of said document object comprises at least one content file and one object descriptor file, said content file comprising a content and said object descriptor file comprising at least one object descriptor defining said content, wherein said object descriptor file comprises a version history, said first and second devices comprising modules for performing the method of storing (S10) a first version of the document object comprising a first version (CF1) of the content file and a first version (ODF1) of the object descriptor file, said first version of the object descriptor file comprising a first version history (H1) defining at least one previous version of said document object on which basis the first version of the document object has been created;
  retrieving a second version history (H2) comprised in a second version (ODF2) of the object descriptor file currently stored as part of a second version of the document object in the cloud, said second version history defining at least one previous version of said document object on which basis the second version of the document object has been created;
  performing a comparison of the first and second version histories (H1, H2) to determine whether any of the first and second versions (DO1, DO2) of the document object originates from the other;
  if it is detected, based on the comparison of the first and second version histories (H1, H2), that the first version (DO1) of the document object originates from the second version (DO2) of the document object while the second version (DO2) of the document object does not originate from the first version (DO1) of the document object, sending the first version (CF1) of the content file to the cloud, independently of the first version of the object descriptor file, to cause the cloud to store said first version of the content file;
  determining a first unique identifier (CID1) which is stored by the cloud (CL) in association with the first version (CF1) of the content file;
  retrieving a unique identifier (CID2) currently stored in the cloud (CL) in association with a version of the content file;
  detecting a file mismatch conflict if the retrieved unique identifier (CID2) does not match the first unique identifier (CID1); and
  resolving the file mismatch conflict by sending the first version (CF1) of the content file for causing said cloud (CL) to re-store said first version of the content file.

19. A non-transitory storage medium carrying instructions of program code for executing the method of:
  storing (S10) a first version of the document object comprising a first version (CF1) of the content file and a first version (ODF1) of the object descriptor file, said first version of the object descriptor file comprising a first version history (H1) defining at least one previous version of said document object on which basis the first version of the document object has been created;

retrieving a second version history (H2) comprised in a second version (ODF2) of the object descriptor file currently stored as part of a second version of the document object in the cloud, said second version history defining at least one previous version of said document object on which basis the second version of the document object has been created;

performing a comparison of the first and second version histories (H1, H2) to determine whether any of the first and second versions (DO1, DO2) of the document object originates from the other;

if it is detected, based on the comparison of the first and second version histories (H1, H2), that the first version (DO1) of the document object originates from the second version (DO2) of the document object while the second version (DO2) of the document object does not originate from the first version (DO1) of the document object, sending the first version (CF1) of the content file to the cloud, independently of the first version of the object descriptor file, to cause the cloud to store said first version of the content file;

determining a first unique identifier (CID1) which is stored by the cloud (CL) in association with the first version (CF1) of the content file;

retrieving a unique identifier (CID2) currently stored in the cloud (CL) in association with a version of the content file;

detecting a file mismatch conflict if the unique identifier (CID2) retrieved does not match the first unique identifier (CID1); and resolving the file mismatch conflict by sending the first version (CF1) of the content file for causing said cloud (CL) to re-store said first version of the content file.

* * * * *